US007439967B2

(12) United States Patent
Tajiri et al.

(10) Patent No.: US 7,439,967 B2
(45) Date of Patent: Oct. 21, 2008

(54) ELECTRO-OPTICAL DEVICE, DRIVING CIRCUIT THEREOF, DRIVING METHOD THEREOF, AND ELECTRONIC APPARATUS USING ELECTRO-OPTICAL DEVICE

(75) Inventors: Kenichi Tajiri, Shiojiri (JP); Satoshi Yatabe, Shiojiri (JP)

(73) Assignee: Seiko Epson Corporation (JP)

( * ) Notice: Subject to any disclaimer, the term of this patent is extended or adjusted under 35 U.S.C. 154(b) by 774 days.

(21) Appl. No.: 10/949,743

(22) Filed: Sep. 24, 2004

(65) Prior Publication Data

US 2005/0110731 A1 May 26, 2005

(30) Foreign Application Priority Data

Sep. 25, 2003 (JP) ............................. 2003-334257

(51) Int. Cl.
*G06F 3/038* (2006.01)

(52) U.S. Cl. ....................................... 345/204; 345/213

(58) Field of Classification Search ........... 345/89-100, 345/204; 348/793
See application file for complete search history.

(56) References Cited

U.S. PATENT DOCUMENTS

| | | | | |
|---|---|---|---|---|
| 6,636,206 | B1 * | 10/2003 | Yatabe | 345/204 |
| 7,034,816 | B2 * | 4/2006 | Yatabe | 345/213 |

FOREIGN PATENT DOCUMENTS

| | | | |
|---|---|---|---|
| JP | 11-052922 | | 2/1999 |
| JP | 2000-056292 | | 2/2000 |
| JP | 2001-147671 | | 5/2001 |
| WO | WO0139165 | * | 5/2001 |

* cited by examiner

*Primary Examiner*—Richard Hjerpe
*Assistant Examiner*—Shaheda A Abdin
(74) *Attorney, Agent, or Firm*—Harness, Dickey & Pierce, P.L.C.

(57) ABSTRACT

An electro-optical device includes pixels provided at intersections of a plurality of scanning lines and a plurality of data lines, a scanning line driving circuit for applying a selected voltage to the respective scanning lines, and a data line driving circuit for applying a turning-on voltage or a turning-off voltage to the respective data lines. The data line driving circuit alternately changes between leading-edge driving including applying the turning-on voltage to a data line corresponding to one of the pixels in a period from the starting point of a period when the selected voltage is applied to the scanning line corresponding to the pixel to the point of time after the lapse of time corresponding to the gray scale of the corresponding pixel and trailing-edge driving including applying the turning-on voltage to the data line corresponding to the pixel in a period from a point of time preceding the final point of the period when the selected voltage is applied to the scanning line corresponding to the pixel by the length of time corresponding to the gray scale of the corresponding pixel to the final point.

8 Claims, 15 Drawing Sheets

LEADING-EDGE DRIVING

TRAILING-EDGE DRIVING

: TURNING-ON VOLTAGE

<Y DIRECTION>

ELECTRO-OPTICAL DEVICE, DRIVING CIRCUIT THEREOF, DRIVING METHOD THEREOF, AND ELECTRONIC APPARATUS USING ELECTRO-OPTICAL DEVICE

RELATED APPLICATIONS

This application claims priority to Japanese Patent Application No. 2003-334257 filed Sep. 25, 2003 which is hereby expressly incorporated by reference herein in its entirety.

BACKGROUND

1. Technical Field

The present invention relates to an electro-optical device for displaying images using electro-optical materials such as liquid crystal, a driving circuit thereof, a driving method thereof, and an electronic apparatus using the electro-optical device.

2. Background Art

Generally, in such an electro-optical device, horizontal crosstalk commonly occurs in which differences in display qualities are generated in a horizontal direction, and horizontal crosstalk still presents a problem in conventional technology. Horizontal crosstalk is considered to be caused by the change in a voltage effective value, which is applied to pixels in accordance with a change of voltage in data lines (segment electrodes). To prevent the generation of horizontal crosstalk, for example, a technology of changing the pulse width of a scanning signal in accordance with the number of data lines, in which voltages change, to correct voltages applied to pixels (see Japanese Unexamined Patent Application Publication No. 11-52922 (FIGS. 1 and 2 and paragraph 0027)) and a technology of detecting distortion of a driving signal (a spike) to add a correction signal to a data signal (see Japanese Unexamined Patent Application Publication No. 2000-56292 (FIG. 1 and paragraph 0017)) are available.

However, since a circuit for generating a correction signal is required for each of the technologies disclosed above, it is difficult to prevent the resulting structure of the devices from being complicated. The complicated structure directly relates to an increase in power consumption and falls short of meeting the low power consumption requirement needed for electro-optical devices.

In order to solve the above problems, it is an object of the present invention to provide an electro-optical device capable of preventing the generation of horizontal crosstalk, a driving circuit thereof, a driving method thereof, and an electronic apparatus using the electro-optical device.

SUMMARY

In order to achieve the above object, there is provided a driving circuit of an electro-optical device for driving pixels provided at intersections of a plurality of scanning lines and a plurality of data lines. The driving circuit comprises a scanning line driving circuit for sequentially selecting the plurality of scanning lines and for applying a selected voltage to the selected scanning lines, and a data line driving circuit for performing, on the plurality of data lines, either leading-edge driving by applying a turning-on voltage having a polarity reverse to a polarity of the selected voltage in a period from the starting point of a period when the selected voltage is applied to the scanning lines to the point of time after the lapse of time corresponding to the gray scale of the pixels corresponding to the intersections of the data lines and the scanning lines, in a greater period when the selected voltage is applied to the scanning lines, and of applying a turning-off voltage having the same polarity as the polarity of the selected voltage in the remainder of the greater period, or trailing-edge driving of applying the turning-on voltage in a period from the point of time preceding the final point of the period when the selected voltage is applied by the length of time corresponding to the gray scale of the corresponding pixel and of applying the turning-off voltage in the remainder of the greater period. The data line driving circuit drives the respective data lines that belong to a first group among the plurality of data lines by the leading-edge driving or a trailing-edge driving in the period when the selected voltage is applied to the respective scanning lines, drives the respective data lines that belong to a second group different from the first group by a different driving mode from the one used for the first group, which is either the leading-edge driving or the trailing-edge driving, and alternately changes the driving modes between the leading-edge driving and the trailing-edge driving for the respective data lines when the selected voltage is applied to the scanning line corresponding to one pixel. The present invention is realized by a method of driving an electro-optical device. Also, the polarity of a selected voltage can be specified using an intermediate voltage which has a value roughly mid-way between the turning-on voltage and the turning-off voltage as a reference.

According to the present invention, the respective data lines that belong to a first group and the respective data lines that belong to a second group among a plurality of data lines are respectively driven by different driving modes (leading-edge driving and trailing-edge driving).

That is, when the respective data lines that belong to the first group are driven by the leading-edge driving, the data lines that belong to the second group are driven by the trailing-edge driving. In such a structure, even if the gray scale of a plurality of pixels that constitute columns in a row direction are the same, the timing at which a voltage applied to the leading-edge driven data lines changes is different from the timing at which a voltage applied to the trailing-edge driven data lines is changed. Thus, the timings at which a spike is generated in a selected voltage in accordance with conversion of voltages applied to data lines are divided in a period when the selected voltage is applied. Furthermore, compared with the structure in which voltages applied to all of the data lines are simultaneously changed, the respective spikes are reduced. Thus, according to the present invention, it is possible to prevent the generation of horizontal crosstalk with a simple structure without having a separate circuit for generating a correction signal for correcting crosstalk. Also, it is possible to arbitrarily divide a plurality of data lines into a first group and a second group. For example, odd data lines may be grouped as the first group and even data lines may be grouped as the second group. Alternatively, a certain number of adjacent data lines may be grouped as a plurality of groups such that some among them are referred to as a first group and the others are referred to as a second group.

It has now been found that the voltage effective value applied to the pixels when trailing-edge driving is performed on the respective data lines does not necessarily coincide with the voltage effective value applied to the pixels when leading-edge driving is performed on the respective data lines (for example, the voltage effective value in the former is smaller than the voltage effective value in the latter). This is because the charges stored in the pixels in the period when a turning-on voltage is applied are discharged in a subsequent period when a turning-off voltage is applied, when leading-edge driving is performed. However, the selection of scanning lines is canceled after the length of the period when the turning-on voltage is applied when the trailing driving is performed, such that the charges are not discharged. Here, in order to prevent the horizontal crosstalk in a period when the selected voltage is applied to a scanning line corresponding to one pixel, either the trailing-edge driving or the leading-edge driving may always be performed with respect to the data line corresponding to the pixel. However, in such a structure, even if the gray scale indicated by the respective pixels are the same, since the voltage effective value of the trailing-edge driven pixels is different from the voltage effective value of the leading-edge driven pixels, the actual gray scale of the pixels are different, hence deteriorating the display quality. Thus, according to the present invention, since trailing-edge driving and leading-edge driving are alternately applied to a certain pixel, it is possible to prevent the deterioration of display quality caused by the difference in the voltage effective values between the trailing-edge driving and the leading-edge driving.

According to a preferred aspect of the present invention, with respect to the data line driving circuit, the leading-edge driving and the trailing-edge driving are alternated every one vertical scanning period or every several vertical scanning periods. According to this aspect, since it is possible to make the length of time of performing the trailing-edge driving equal to the length of time of performing the leading-edge driving by a very simple and easy structure, it is possible to accurately compensate for differences in the voltage effective values between the leading-edge driving and the trailing-edge driving.

According to a preferred aspect of the invention, the scanning line driving circuit applies a selected voltage to the selected scanning lines in the first half period or the second half period obtained by dividing one horizontal scanning period, in which the respective scanning lines are selected. The data line driving circuit applies, to a plurality of data lines, a turning-on voltage in a period corresponding to the gray scale of the corresponding pixel in the first half period or the second half period, and a turning-off voltage in the remainder of the period, and applies the turning-off voltage in a period corresponding to the gray scale of the corresponding pixel in the other half period which is either the first half period or the second half period, and the turning-on voltage in the remainder of the period. According to this aspect, in a period when the selected voltage is not applied to the scanning line (the other half period which is the first half or the second half), since it is possible to make the length of the time of applying the turning-on voltage to the data lines in the horizontal scanning period roughly equal to the length of time of applying the turning-off voltage, it is possible to prevent the deterioration of display quality dependent on the contents of displayed images.

According to another aspect of the invention, the scanning line driving circuit inverts the polarity of the selected voltage based on an intermediate voltage which has a value roughly mid-way between the turning-on voltage and the turning-off voltage in every horizontal scanning period or vertical scanning period for selecting the scanning line. According to this aspect, since voltages having different polarities are alternately applied to the pixels, it is possible to prevent the deterioration of the pixels caused by the application of direct current (DC).

According to a preferred aspect of the present invention, a control circuit for outputting a first gray scale control signal (corresponding to a leading-edge driving gray scale control pulse GCPa according to an embodiment) for indicating a plurality of points of time when the voltages of the data lines are to be changed during the leading-edge driving in a period when the selected voltage is applied to the scanning line and a second gray scale control signal (corresponding to a trailing-edge driving gray scale control pulse GCPb according to the embodiment) for indicating a plurality of points of time when the voltages of the data lines are to be changed during the trailing-edge driving in a synchronizing period is provided such that, the data line driving circuit changes the voltages applied to the data lines at the point of time corresponding to the gray scale of the pixel among the plurality of points of time (the falling timing of the leading-edge driving gray scale control pulse GCPa) indicated by the first gray scale control signal when the leading-edge driving is performed and changes the voltages applied to the data lines at the point of time corresponding to the gray scale of the pixel among the plurality of points of time (the falling timing of the trailing-edge driving gray scale control pulse GCPb) indicated by the second gray scale control signal when the trailing-edge driving is performed. In this aspect, when the plurality of points of time indicated by the first gray scale control signal and the plurality of points of time indicated by a second gray scale control signal are symmetrical (when the length of time of the period of applying the turning-on voltage corresponding to each gray scale to the leading-edge driving is equal to the length of time of the period of applying the turning-on voltage corresponding to each gray scale to the trailing-edge driving), even when the same gray scale is indicated for a pixel, there may be differences between the voltage effective value of the leading-edge driven pixels and the voltage effective value of the trailing-edge driven pixels. Thus, it is preferable to select a plurality of points of time indicated by the respective gray scale control signals. Specifically, when the voltage effective value of the leading-edge driven pixels is larger than the voltage effective value of the trailing-edge driven pixels, the respective gray scale control signals are preferably generated such that the length of time from the point of time when the selected voltage is applied to the scanning line to the plurality of points of time indicated by the first gray scale control signal, is smaller than the length of time from the plurality of points of time indicated by the second gray scale control signal to the final point of the corresponding application period. On the other hand, when the voltage effective value of the trailing-edge driven pixels is larger than the voltage effective value of the leading-edge driven pixels, the respective gray scale control signals are preferably generated such that the length of time from the point of time where the selected voltage is applied to the scanning line to the plurality of points of time indicated by the first gray scale control signal, is larger than the length of time from the plurality of points of time indicated by the second gray scale control signal to the final point of the corresponding application period. According to these aspects, the length of time from the point of time when the selected voltage is applied to the plurality of points indicated by the first gray scale control signals is different from the length of time from the plurality of points of time indicated by the second gray scale control signal to the final point of the application of the selected voltage. According to this aspect, it is possible to accurately reduce differences between in the voltage effective value of the leading-edge driving and the trailing-edge driving to improve display quality.

In order to achieve the above object, the electro-optical device according to the present invention includes the driving circuit. Specifically, an electro-optical device according to the present invention comprises pixels provided at intersections of a plurality of scanning lines and a plurality of data lines, a scanning line driving circuit for sequentially selecting the plurality of scanning lines and for applying a selected voltage to the selected scanning lines, and a data line driving circuit for performing, on the plurality of data lines, either a leading-edge driving of applying a turning-on voltage having a polarity reverse to a polarity of the selected voltage in a period from the starting point of a period when the selected voltage is applied to the scanning lines to the point of time after the lapse of time corresponding to the gray scale of the pixels corresponding to the intersections of the data lines and the scanning lines, in a greater period when the selected voltage is applied to the scanning lines, and of applying a turning-off voltage having the same polarity as the polarity of the selected voltage in the remainder of the greater period, or a trailing-edge driving of applying the turning-on voltage in a period from the point of time preceding the final point of the period when the selected voltage is applied by the length of time corresponding to the gray scale of the corresponding pixel, and of applying the turning-off voltage in the remainder of the greater period. The data line driving circuit drives the respective data lines that belong to a first group among the plurality of data lines by a leading-edge driving or a leading-edge driving in the period when the selected voltage is applied to the respective scanning lines, drives the respective data lines that belong to a second group different from the first group by a different driving mode from the one used for the first group, which is either the leading-edge driving or the trailing-edge driving, and alternately changes the driving modes between the leading-edge driving and the trailing-edge driving for the respective data lines when the selected voltage is applied to the scanning line corresponding to one pixel. According to such an electro-optical device, it is possible to prevent the generation of horizontal crosstalk by a simple and easy structure like in the driving circuit and to prevent the deterioration of the display quality caused by the differences in the voltage effective value between the trailing-edge driving and the leading-edge driving.

According to the present invention, it is possible to prevent the generation of the horizontal crosstalk by a simple and easy structure.

DETAILED DESCRIPTION

Hereinafter, preferred embodiments of the present invention will be described with reference to the drawings. The scales of each layer and member are different to make each layer and member recognizable in the figures.

A: Electro-Optical Device

Figure 1:
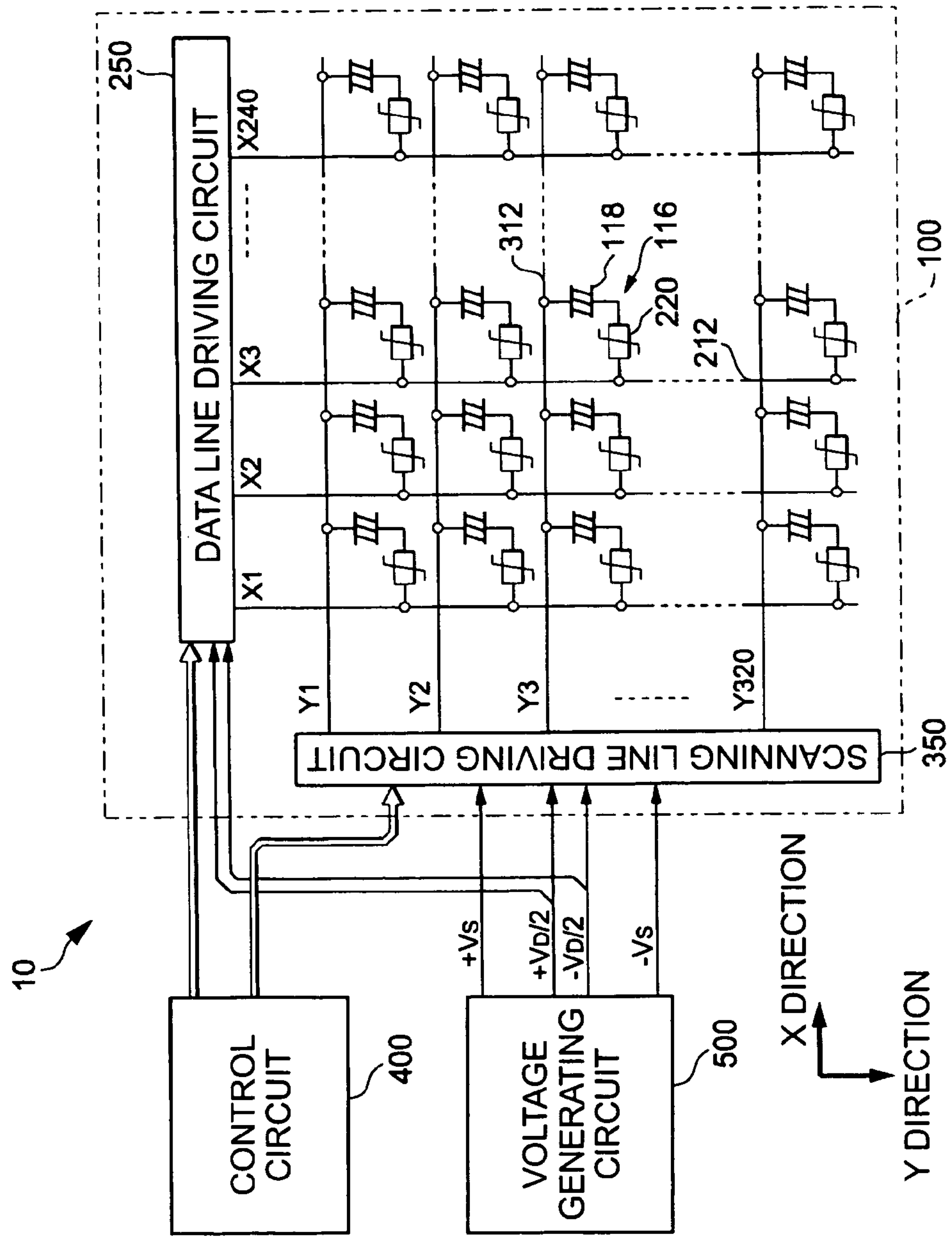
FIG. 1 is a block diagram illustrating the structure of an electro-optical device according to an embodiment of the present invention.

FIG. 1 is a block diagram illustrating the structure of an electro-optical device according to an embodiment of the present invention. As illustrated in FIG. 1, an electro-optical device 10 comprises a liquid crystal panel 100, a control circuit 400, and a voltage generating circuit 500. Among them, the liquid crystal panel 100 comprises a plurality of data lines (segment electrodes) 212 that extend in the column (Y) direction and a plurality of scanning lines (common electrodes) 312 that extend in the row (X) direction. Pixels 116 are formed at the points where the data lines 212 intersect the scanning lines 312. The pixels 116 have thin film diodes (TFDs) 220 that are two terminal switching elements and liquid crystal capacitors 118 serially connected to the TFDs 220. Among them, to be described later, the liquid crystal capacitors 118 are obtained by interposing liquid crystal that is an electro-optical material between the scanning lines 312 and rectangular pixel electrodes. According to the present embodiment, the total number of scanning numbers 312 is 320 and the total number of data lines 212 is 240 to obtain a display device in a matrix of 320 rows×240 columns. However, the present invention is not limited to this.

A scanning line driving circuit 350 supplies scanning signals Y1, Y2, Y3, . . . , and Y320 to the scanning lines 312 of the first row, the second row, the third row, . . . , and the 320$^{th}$ row, respectively. To be more specific, the scanning line driving circuit 350 selects the 320 scanning lines 312 one by one and supplies a selected voltage to the selected scanning line 312 and a non-selected voltage to the other scanning lines 312. The data line driving circuit 250 supplies data signals X1, X2, X3, . . . , and X240 corresponding to the display contents (gray scale) to the pixels 116 of a row corresponding to the scanning line 312 selected by the scanning line driving circuit 350 through the first, second, third, . . . , and 240$^{th}$ data lines 212, respectively. Also, the detailed structures of the data line driving circuit 250 and the scanning line driving circuit 350 will be described later.

On the other hand, a control circuit 400 supplies various signals such as a control signal and a clock signal for horizontally scanning the liquid crystal panel 100 to the data line driving circuit 250 and supplies various signals such as a control signal and a clock signal for vertically scanning the liquid crystal panel 100 to the scanning line driving circuit 350. Furthermore, the control circuit 400 supplies gray scale data of three bits that represents the gray scale of the pixels 116 by eight steps from 0 to 7 to the data line driving circuit 250 in synchronization with the vertical scanning and the horizontal scanning. Here, according to the present embodiment, the brightest white gray scale are indicated by the gray scale data [000], and a dark gray scale (brightness) is indicated as decimal scale of gray scale data increases, such that the darkest gray scale is indicated by the gray scale data [111]. Also, with respect to the liquid crystal panel 100 according to the present embodiment, a normally white mode where white display is performed when no voltage is applied to liquid crystal is adopted.

A voltage generating circuit 500 generates a voltage $\pm V_S$ and a voltage $\pm V_D/2$ used for the liquid crystal panel 100. Among them, the voltage $\pm V_S$ is supplied to the scanning line driving circuit 350 and is used as a selected voltage in a scanning signal. The voltage $\pm V_D/2$ is supplied to the scanning line driving circuit 350 and the data line driving circuit 250 and is used as a non-selected voltage in a scanning signal and a data voltage in a data signal.

Figure 2:
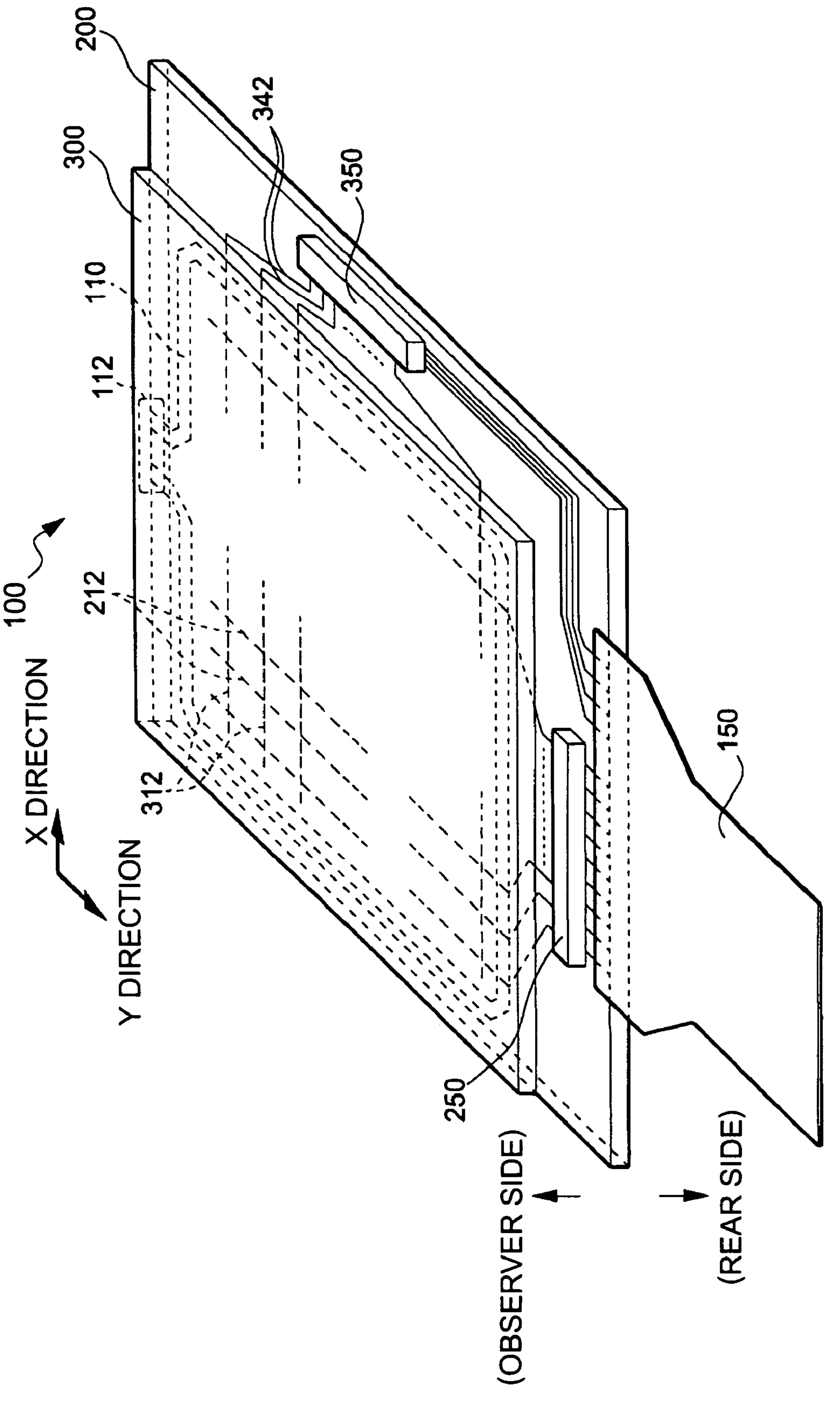
FIG. 2 is a perspective view illustrating the structure of the electro-optical device.
Figure 3:
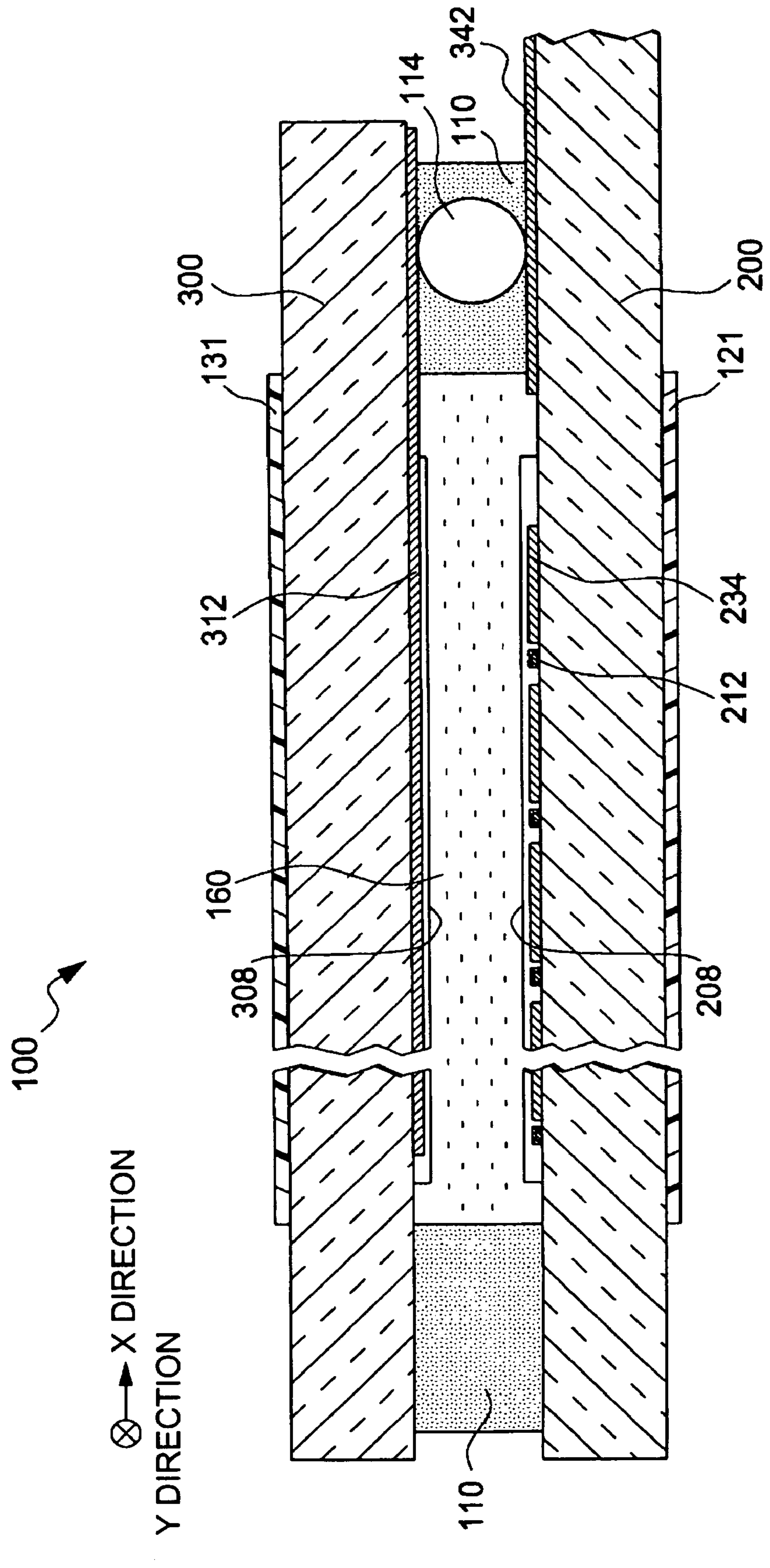
FIG. 3 is a sectional view illustrating the structure of a liquid crystal panel in the electro-optical device.

Next, FIG. 2 is a perspective view illustrating the entire structure of the liquid crystal panel 100. FIG. 3 is a sectional view illustrating a structure when the liquid crystal panel 100 is taken along the row (X) direction. As illustrated in FIGS. 2 and 3, the liquid crystal panel 100 includes an element substrate 200 provided on the rear side and a counter substrate 300 that faces the element substrate 200 from the observer side. The element substrate 200 and the counter substrate 300 are connected to each other to be spaced from each other by a uniform gap (distance) by a sealing material 110, into which conductive particles 114 used as spacers are mixed. Twisted Nematic (TN) liquid crystal 160 is filled in a space surrounded by the element substrate 200, the counter substrate 300, and the sealing material 110. Also, as illustrated in FIG. 2, the sealing material 110 is formed in the shape of a frame along the internal edge of the counter substrate. However, in order to fill the liquid crystal 160, part of the sealing material 110 is opened. The opening is sealed by a sealing material 112 after filling the liquid crystal 160. According to the present embodiment, the liquid crystal panel 100 is a transmissive liquid crystal panel that performs display (transmissive display) by transmitting incident light from the rear side to the observer side. Thus, on the rear side of the element substrate 200, a back light unit that uniformly radiates light is provided. However, since the back light unit is not directly related to the present invention, it is not shown.

On the surface of the counter substrate 300, which faces the element substrate 200, an alignment film 308, on which a rubbing process is performed in a predetermined direction, as well as the scanning lines that are band-shaped electrodes that extend in the row (X) direction is formed. Here, in particular, as illustrated in FIG. 3, one end of each of the scanning lines 312 extends to the region where the sealing material 110 is formed. A polarizer 131 can be attached to the external side (the observer side) of the counter substrate 300 (omitted in FIG. 2), such that the direction of the absorption axis is selected in accordance with the direction, in which the rubbing process is performed on the alignment film 308.

On the other hand, on the surface of the element substrate 200, which faces the counter substrate 300, rectangular pixel electrodes 234 are formed to be adjacent to the data lines 212 that extend in the column (Y) direction and an alignment film 208, on which a rubbing process is performed in a constant direction, is formed. Furthermore, wiring lines 342 are provided on the element substrate 200 so as to correspond to the scanning lines 312, respectively. To be specific, in particular, as illustrated in FIG. 3, one end of each of the wiring lines 342 is formed to face one end of each of the corresponding scanning lines 312 in the region where the sealing material 110 is formed. Here, the conductive particles 114 are dispersed into the sealing material 110 such that one or more particles exist in the portion where one end of each of the scanning lines 312 faces one end of each of the wiring lines 342. Under such a structure, the scanning lines 312 formed on the counter substrate 300 are connected to the wiring lines 342 on the element substrate 200 through the conductive particles 114. One end of each of the data lines 212 formed on the element substrate 200 is directly drawn to the outside of the sealing material 110. Furthermore, the polarizer 121 (which is omitted in FIG. 2) may be attached to the external side (on the rear side) of the element substrate 200 such that the direction of the absorption axis is selected in accordance with the direction, in which the rubbing process is performed on the alignment film 308.

Subsequently, the structures of the regions other than a display region in a liquid crystal panel 100 will now be described. As illustrated in FIG. 2, on two sides of the element substrate 200, which protrude beyond the counter substrate 300, the data line driving circuit 250 for driving the data lines 212 and the scanning line driving circuit 350 for driving the scanning lines 312 are mounted by a chip on glass (COG) technology. According to this technology, the data line driving circuit 250 directly supplies data signals to the data lines and the scanning line driving circuit 350 indirectly supplies scanning signals to the scanning lines 312 through the wiring lines 342 and the conductive particles 114. The data line driving circuit 250 and the scanning line driving circuit 350 in FIG. 1 are positioned on the upper side and left side of the liquid crystal panel 100 unlike in FIG. 2, which are measures taken for convenience's sake in order to describe an electrical structure. On the other hand, one end of a flexible printed circuit (FPC) substrate 150 is connected to the outside of the region, in which the data line driving circuit 250 is mounted. The other end of the FPC substrate 150 is connected to a control circuit 400 and a voltage generating circuit 500 in FIG. 1 though not shown in FIG. 2.

Figure 4:
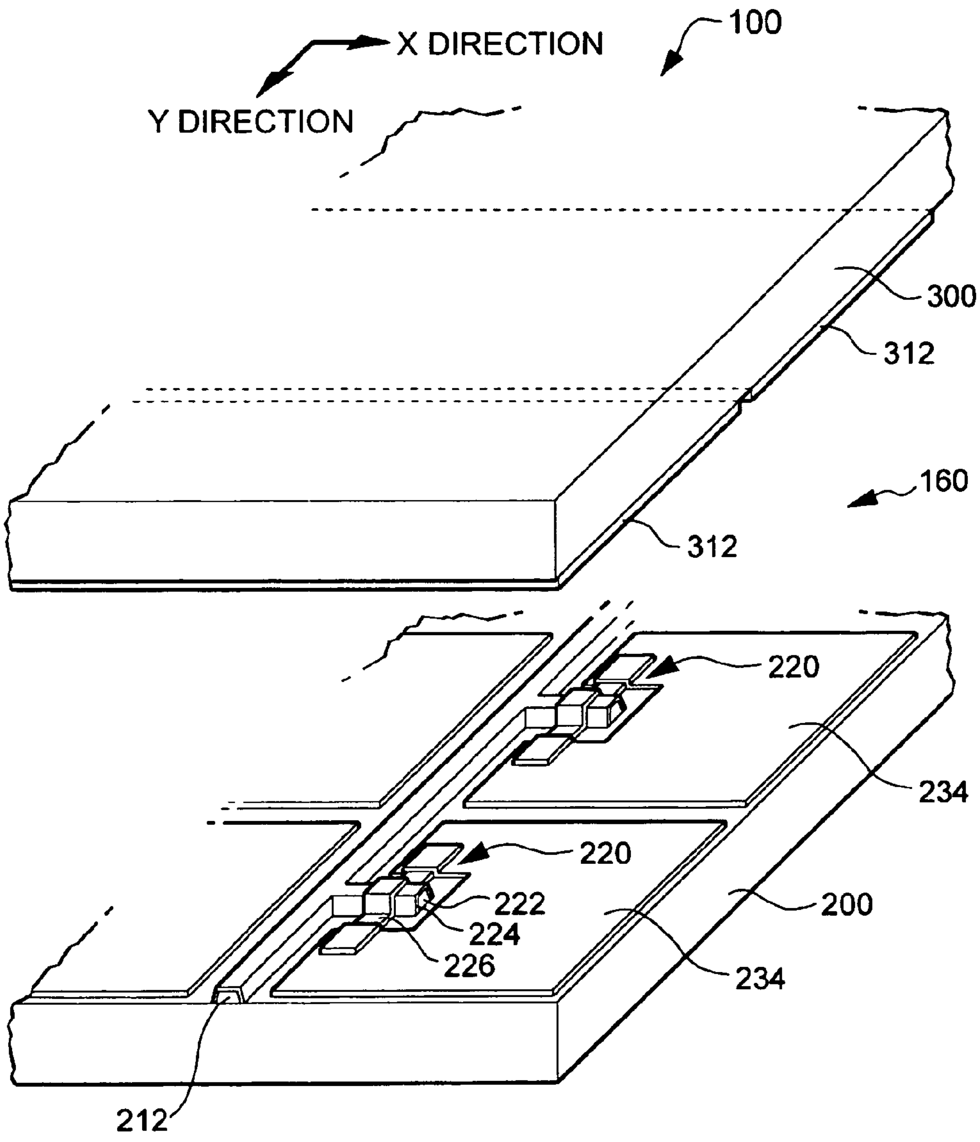
FIG. 4 is a perspective view illustrating the structure of a pixel.

Next, the detailed structure of the pixels 116 in the liquid crystal panel 100 will be described. FIG. 4 is a perspective view illustrating the structure of the liquid crystal panel 100. In FIG. 4, the alignment films 208 and 308 and the polarizers 121 and 131 in FIG. 3 are omitted. As illustrated in FIG. 4, on the surface of the element substrate 200, which faces the counter substrate 300, the rectangular pixel electrodes 234 made of a transparent conductive material such as indium tin oxide (ITO) are arranged in a matrix in column and row directions. Among them, the plurality of pixel electrodes 234 arranged in parallel in the column direction are connected to the common data line 212 through the TFDs 220. Here, the TFDs 220 are made of tantalum monomer or tantalum alloy seen from the substrate and comprise T-shaped first conductors 222 branched from the data lines 212, insulating substances 224 obtained by anodizing the first conductors 222, and second conductors 226 made of chrome, and so on to form a sandwich structure of conductor/insulating substance/conductor. Thus, the TFDs 220 have a diode switching characteristic, in which a current-voltage characteristic is nonlinear in both positive and negative directions.

On the other hand, on the surface of the counter substrate 300, which faces the element substrate 200, the scanning lines 312 made of ITO extend in the row direction orthogonal to the data lines 212 and face the plurality of pixel electrodes 234 that extend in the row direction. Thus, the scanning lines 312 function as the counter electrodes of the pixel electrodes 234. The liquid crystal capacitors 118 in FIG. 1 are formed of the liquid crystal 160 interposed between the scanning lines 312 and the pixel electrodes 234 at the intersections of the data lines 212 and the scanning lines 312.

In such a structure, when any one of selected voltages $+V_S$ and $-V_S$ that force the TFDs 220 to a conducting state (ON state) is applied to the scanning lines 312, the TFDs 220 corresponding to the intersections of the scanning lines 312 and the data lines 212 are switched on regardless of the data voltage applied to the data lines 212, such that charges in accordance with the difference between the corresponding selected voltage and the corresponding data voltage are stored in the liquid crystal capacitors 118 connected to the TFDs 220. Although the non-selected voltage is applied to the scanning lines 312 to switch off the TFDs 220 after the charges are stored, the charges remain stored in the liquid crystal capacitors 118. The alignment state of the liquid crystal 160 changes corresponding to the amount of charges stored in the liquid crystal capacitors 118. The amount of light that passes through the polarizers 121 and 131 changes corresponding to the amount of stored charges. Thus, the amount of charges stored in the liquid crystal capacitors 118 is controlled corresponding to the data voltage when the selected voltage is applied is controlled in each of the pixels 116 to perform desired gray scale display.

Figure 5A:
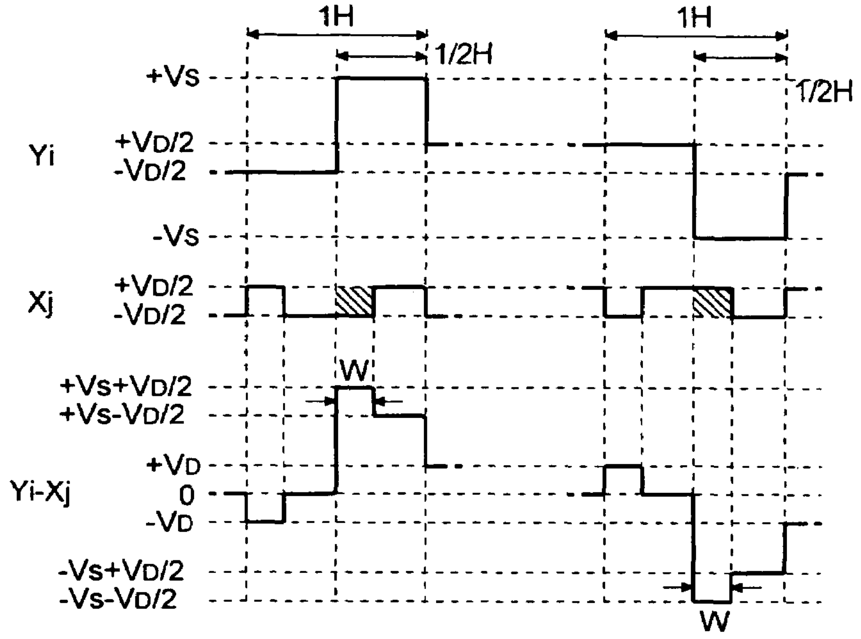
FIGS. 5A and B are views illustrating a leading-edge driving and a leading-edge driving.
Figure 5B:
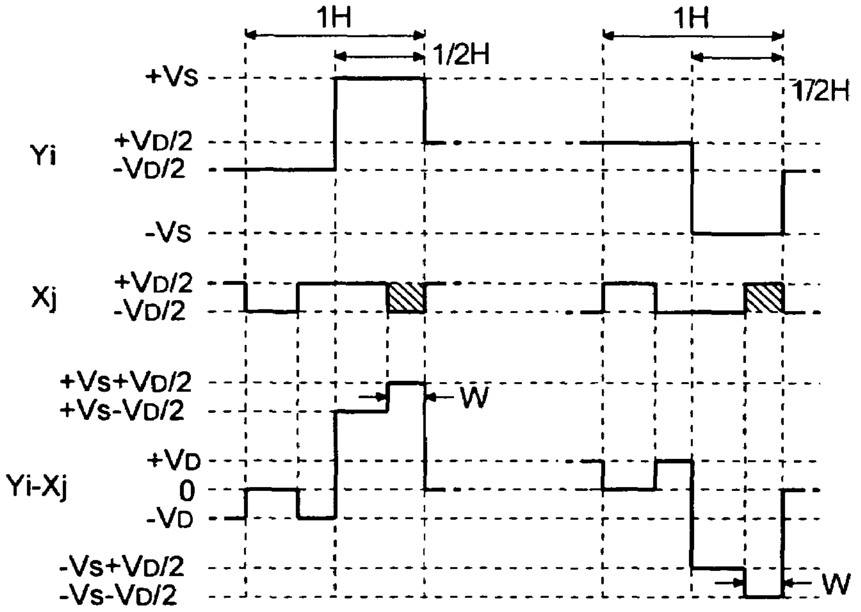

Here, a method of displaying gray scale by the liquid crystal panel 100 having the above-described structure will now be schematically described. According to the present embodiment, as illustrated in FIGS. 5(*a*) and 5(*b*), one horizontal scanning period (1 H) is divided into a first half period and a second half period such that the scanning signal becomes the selected voltage $+V_S$ or $-V_S$ in the second half period. On the other hand, in the second half period, the data signal becomes a turning-on voltage in a period corresponding to the gray scale of the pixels 116 and becomes a turning-off voltage in the remainder of the period (gray scale display by modulating pulse width). Here, the turning-on voltage is a negative polarity data voltage $-V_D/2$ when the selected voltage is a positive polarity $+V_S$, and is a positive polarity data voltage $+V_D/2$ when the selected voltage is a negative polarity $-V_S$. Since the liquid crystal panel 100 according to the present embodiment adopts a normally white mode, when the turning-on voltage is applied, the gray scale of the pixels 116 becomes dark. On the other hand, in the first half period prior to the second half period, the voltage of the data signal is obtained by inverting the voltage of the data signal in the second half period. Thus, regardless of the gray scale 116, the length of time required for making the data signal Xj (j is a natural number that satisfies $1 \leqq j \leqq 240$) voltage $+V_D/2$ is equal to the length of time required for making the data signal Xj voltage $-V_D/2$ in one horizontal scanning period. According to the driving method, the voltage effective values applied to the pixels 116 (to be specific, to the liquid crystal capacitors 118) in a period when the scanning lines 312 are not selected are equal with respect to all of the pixels 116. As a result, it is possible to prevent crosstalk in the column (vertical) direction generated when a checkered pattern, in which white pixels and black pixels are alternately arranged in column and row directions, and a zebra pattern, in which any one of the white pixels and the black pixels is arranged in the column direction such that white and black are inverted in every row are displayed.

The method of displaying gray scale by modulating pulse width includes a method (hereinafter, a leading-edge driving) of driving the pixels 116 by applying the turning-on voltage at an initial stage of the second half period of the one horizontal scanning period and a method (hereinafter, a leading-edge driving) of driving the pixels 116 by applying the turning-on voltage at the final stage of the second half period. Further, specifically, according to the leading-edge driving, as illustrated in FIG. 5(*a*), in the second half period, the turning-on voltage is applied to the data lines 212 from the point of time (that is, the point of time where the application of the selected voltage to the scanning lines 312 starts) to the point of time after the lapse of time corresponding to the gray scale of the pixels 116 and the turning-off voltage is applied to the data lines 212 in the remainder of the period. In the trailing driving mode, as illustrated in FIG. 5(*b*), in the second half period, the turning-on voltage is applied to the data lines 212 in the period from the point of time preceding the final point (the point of time where the application of the selected voltage to the scanning lines 312 ends) by the length of time corresponding to the gray scale of the pixels 116 to the point of time where the application of the selected voltage ends, and the turning-off voltage is applied to the data lines 212 in the remainder of the period. Details will be described later. However, according to the present embodiment, the driving modes (the leading-edge driving and the trailing-edge driving) applied to the plurality of pixels 116 are alternately changed every one vertical scanning period (1F (frame)).

Figure 7:
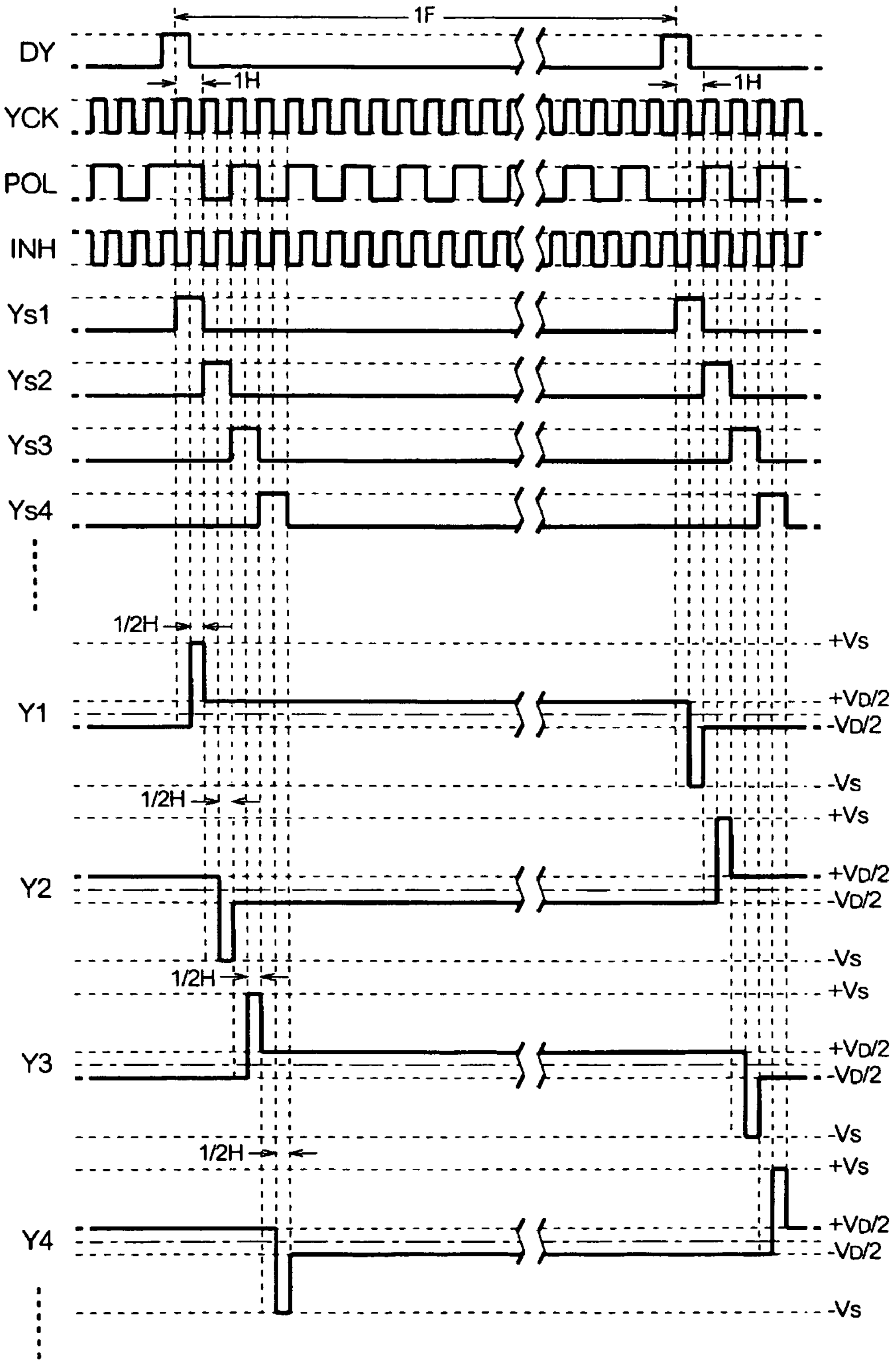
FIG. 7 is a timing chart illustrating the operation of a data line driving circuit.

Next, various signals generated by the control circuit 400 in FIG. 1 will now be described. First, signals used in the Y (vertical scanning) direction will be described. First, as illustrated in FIG. 7, a start pulse DY is output at an initial stage of one vertical scanning period. Second, a clock signal YCK is a reference signal in the Y direction and, as illustrated in FIG. 7, has a period corresponding to the length of time of one horizontal scanning period. Third, a polarity indicating signal POL indicates the polarity of the selected voltage to be applied when the scanning line 312 is selected. When the polarity indicating signal POL is at an H level, the polarity indicating signal indicates the positive polarity selected voltage $+V_S$. When the polarity indicating signal POL is at an L level, the polarity indicating signal indicates the negative polarity selected voltage $-V_S$.

As illustrated in FIG. 7, the logic level of the polarity indicating signal POL is inverted every one horizontal scanning period in one vertical scanning period and in temporally leading and trailing vertical scanning periods in a horizontal scanning period when the same scanning line 312 is selected. Fourth, a control signal INH is a signal for defining a period for applying the selected voltage in the 1 horizontal scanning period. As described above, according to the present embodiment, since the selected voltage is applied to the scanning line 312 in the second half period of the 1 horizontal scanning period, the control signal INH is at the H level in the second half period of the 1 horizontal scanning period.

Figure 9:
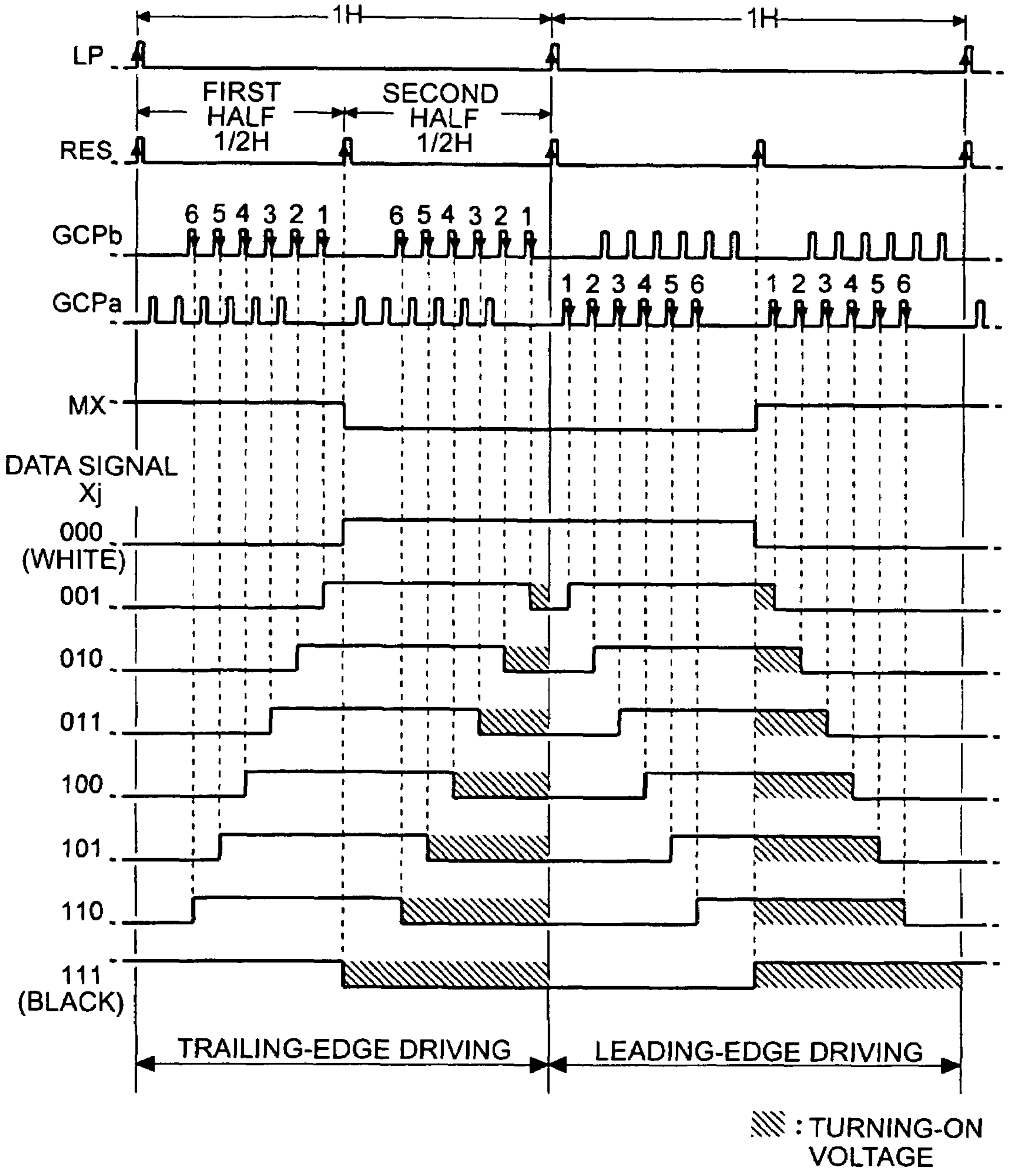
FIG. 9 is a timing chart illustrating the operation of a data line driving circuit.
Figure 11:
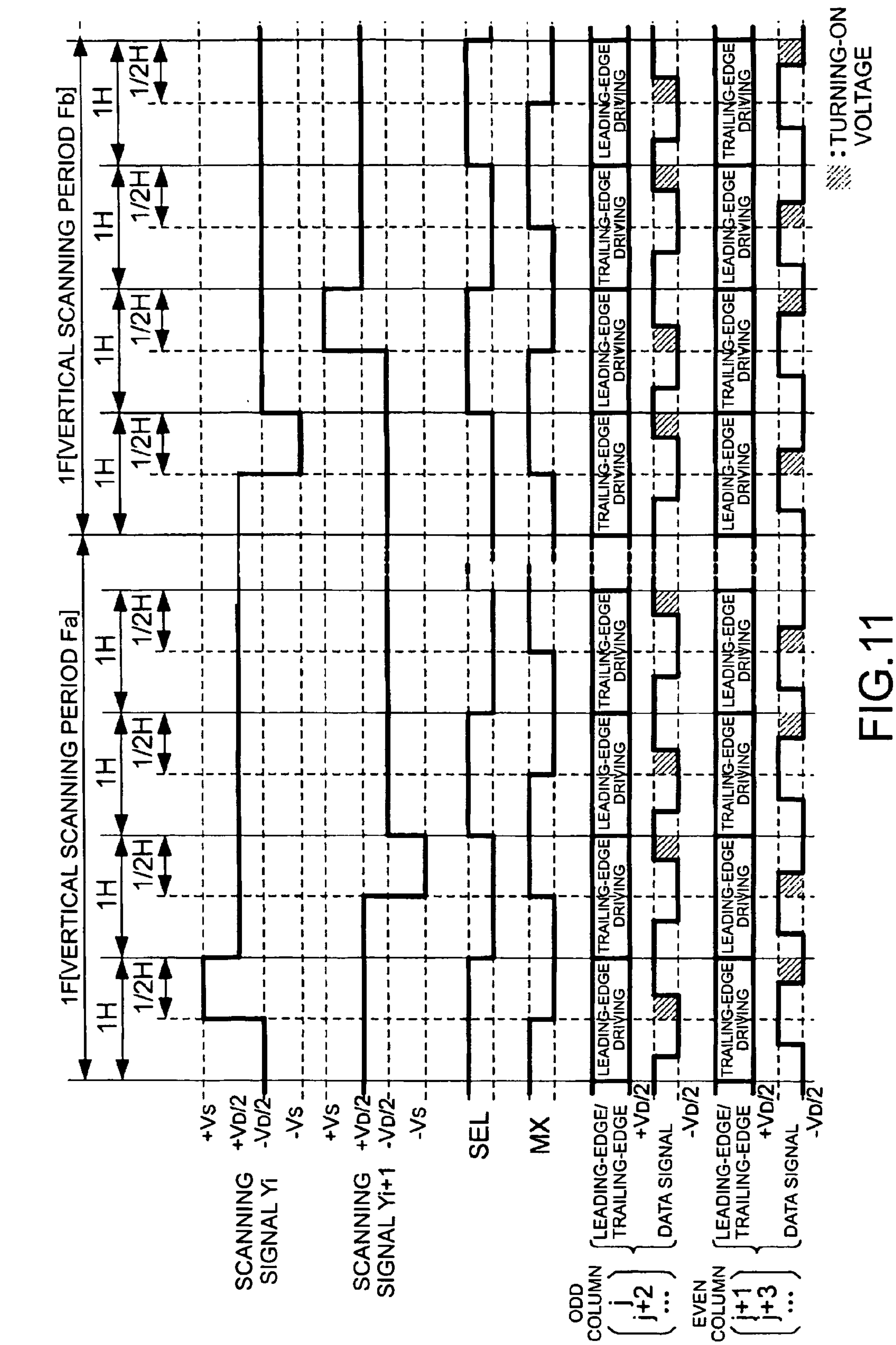
FIG. 11 is a timing chart illustrating the operation of the data line driving circuit.

Next, signals used in the X (horizontal scanning) direction will be described. First, as illustrated in FIG. 9, a latch pulse LP is output at the initial stage of the 1 horizontal scanning period. Second, as illustrated in FIG. 9, a reset signal RES is a pulse output at the initial stage of the first half period and at the initial stage of the second half period of the 1 horizontal scanning period. Third, an alternate current (AC) driving signal MX is a signal for the data lines 212 to AC drive the pixels 116 and has its phase proceed by 90° more than the polarity indicating signal POL for indicating the polarity of the Y direction. That is, as illustrated in FIG. 11, in the horizontal scanning period when the positive polarity voltage $+V_S$ is indicated as the selected voltage (that is, the polarity indicating signal POL is at the H level), the AC driving signal MX is at the H level in the first half period and is at the L level in the second half period. In the horizontal scanning period when the negative polarity voltage $-V_S$ is indicated as the selected voltage (that is, the polarity indicating signal POL is at the L level), the AC driving signal MX is at the L level in the first half period and is at the H level in the second half period.

Fourth, a leading and trailing-edge selecting signal SEL indicates a driving method for displaying gray scale on the respective pixels 116. As illustrated in FIG. 11, the logic level of the leading and trailing-edge selecting signal SEL is inverted in a vertical scanning period every horizontal scanning period and in temporally leading and trailing vertical scanning periods in a horizontal scanning period when the same scanning line 312 is selected. That is, the waveform of the leading and trailing-edge selecting signal SEL is the same as that of the polarity indicating signal POL. Thus, the polarity indicating signal POL can be used as a signal for indicating any one of the leading-edge driving and the trailing-edge driving. However, for convenience sake, the leading and trailing-edge selecting signal SEL and the polarity indicating signal POL are distinguished from each other.

Fifth, a leading-edge driving gray scale control pulse GCPa is used for controlling the gray scale of the pixels 116 by the leading-edge driving. A trailing-edge driving gray scale control pulse GCPb is used for controlling the gray scale of the pixels 116 by the leading-edge driving. To be specific, the leading-edge driving gray scale control pulse GCPa and the trailing-edge driving gray scale control pulse GCPb are output at the timing corresponding to the gray scale (intermediate gray scale displayed by gray scale data [110], [101], [100], [011], [010], and [001]) excluding white and black scales in the first half period and the second half of the 1 horizontal scanning period. As illustrated in FIG. 9, in either the leading-edge driving gray scale control pulse GCPa or the trailing-edge driving gray scale control pulse GCPb, the data voltage is changed at the timing where the pulse corresponding to the gray scale data falls to display gray scale corresponding to gray scale data. The timing (signal waveform), at which the leading-edge driving gray scale control pulse GCPa is output, is different from the timing, at which the trailing-edge driving gray scale control pulse GCPb is output. To be specific, the leading-edge driving gray scale control pulse GCPa is output at the point of time after the lapse of time corresponding to the respective intermediate gray scale from the respective points of time of the first half period and the second half period of the 1 horizontal scanning period. The trailing-edge driving gray scale control pulse GCPb is output at the point of time preceding the final points of the first half period and the second half period of the 1 horizontal scanning period by the length of time corresponding to the respective intermediate gray scale. In the examples illustrated in FIGS. 9, 1, 2, 3, 4, 5, and 6 are assigned to the leading-edge driving gray scale control pulses GCPa and the trailing-edge driving gray scale control pulses GCPb corresponding to the gray scale data [001], [010], [011], [100], [101], and [110]. As noted from the correspondence relationship, the trailing-edge driving gray scale control pulses GCPb corresponding to the gray scale data [001], [010], [011], [100], [101], and [110] are arranged from the respective final points of the first half period and the second half period forward (in a retroactive direction) on a time base in such an order. Thus, for example, in FIG. 9, the length of time from the point of time of the falling of the trailing-edge driving gray scale control pulse GCPb assigned with 1 to the final point of the second half period is the length of time corresponding to the gray scale data [001]. The length of time from the point of time of the falling of the trailing-edge driving gray scale control pulse GCPb assigned with 2 to the final point of the second half period is the length of time corresponding to the gray scale data [010]. The leading-edge driving gray scale control pulses GCPa corresponding to the gray scale [001], [010], [011], [100], [101], and [110] are arranged from the points of time of the first half period and the second half period in the direction where time is to lapse in such an order. Thus, for example, in FIG. 9, the length of time from the point of time of the second half period to the point of time of the falling of the leading-edge driving gray scale control pulse GCPa assigned with 1 is the length of time corresponding to the gray scale data [001]. The length of time from the point of time of the second half period to the point of time of the falling of the leading-edge driving gray scale control pulse GCPa assigned with 2 is the length of time corresponding to the gray scale data [010]. The timing at which the trailing-edge driving gray scale control pulse GCPb is output and the timing at which the leading-edge driving gray scale control pulse GCPa is output are selected in consideration of an applied voltage-concentration (transmittance) characteristic (V-T characteristic) of liquid crystal, and the temporal distances of the respective pulses are not equal to each other.

Figure 6:
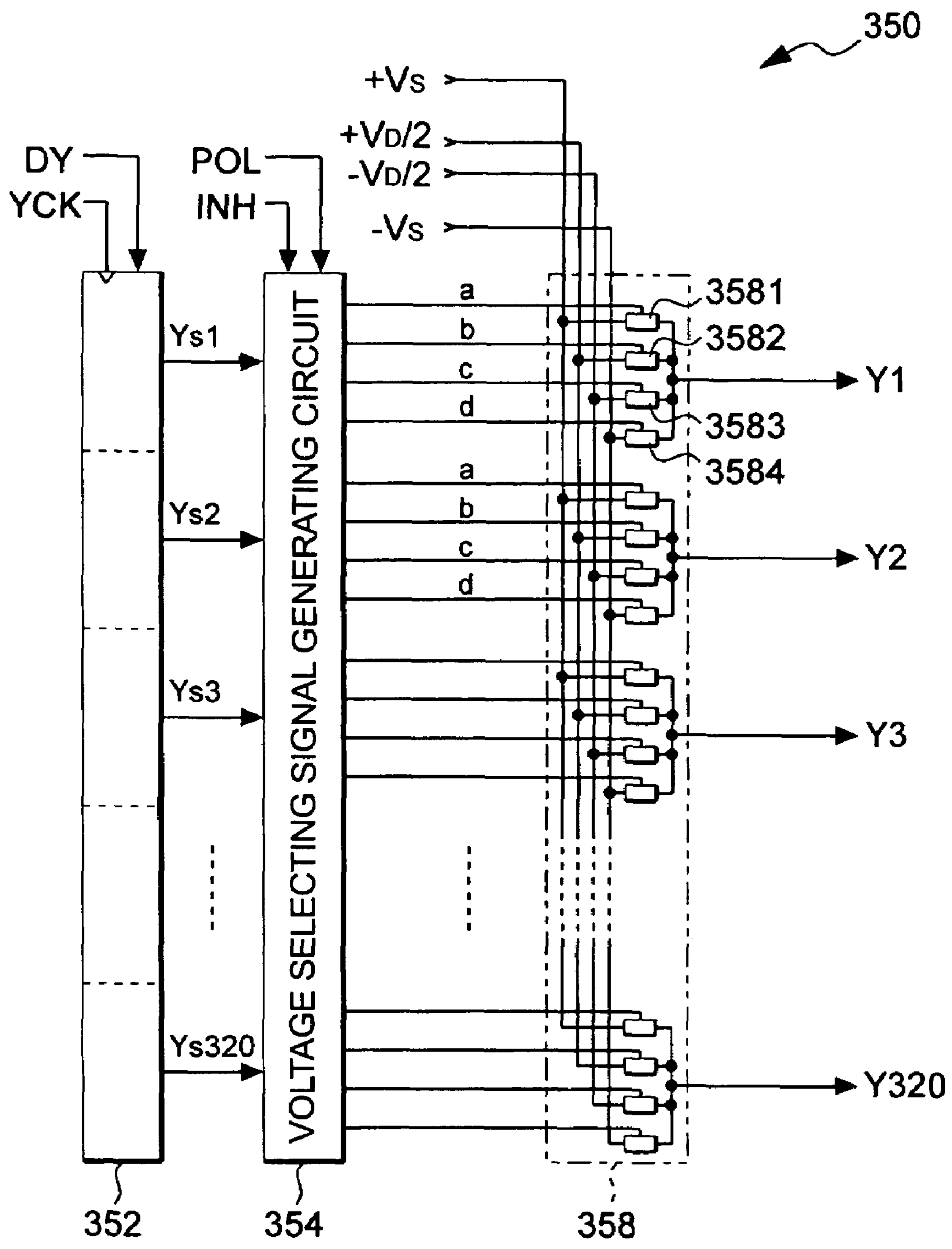
FIG. 6 is a block diagram illustrating the structure of a scanning line driving circuit.

Next, the structure of the scanning line driving circuit 350 will be described with reference to FIG. 6. In FIG. 6, a shift register 352 having stages of 320 bits corresponding to the total number of scanning lines 312 sequentially shifts the start pulse DY supplied at the initial stage of the 1 vertical scanning period by the clock signal YCK and outputs the start pulse DY as transmission signals Ys1, Ys2, Ys3, . . . , and Ys320.

The transmission signals Ys1, Ys2, Ys3, . . . , Ys320 correspond one to one to the scanning lines 312 of the first row, the second row, the third row, . . . , and the $320^{th}$ row. That is, when several transmission signals are at the H level, it is indicated that the horizontal scanning period has arrived, in which the scanning lines 312 corresponding to the transmission signals are to be selected.

Subsequently, a voltage selecting signal forming circuit 354 outputs voltage selecting signals a, b, c, and d for indicating voltages applied to the scanning lines 312 of the respective rows based on the transmission signals, the polarity indicating signals POL, and the control signals INH. The voltage selecting signals a, b, c, and d are exclusively at an active level (the H level). When the voltage selecting signal a is at the H level, the selection of $+V_S$ (the positive polarity selected voltage) is indicated. Similarly, when the voltage selecting signals b, c, and d are at the H level, the selections of $+V_D/2$ (the positive polarity non-selected voltage), $-V_D/2$ (the negative polarity non-selected voltage), and $-V_S$ (the negative polarity selected voltage) are indicated.

As described above, according to the present embodiment, the period, in which the selected voltage $+V_S$ or $-V_S$ is applied, is the second half period (½ H in the drawings) of the 1 horizontal scanning period. The non-selected voltage is $+V_D/2$ after the selected voltage $+V_S$ is applied, is $-V_D/2$ after the selected voltage $-V_S$ is applied, and is arbitrarily determined by the immediate before selected voltage. The voltage selecting signal forming circuit 354 outputs the voltage selecting signals a, b, c, and d to the scanning lines 312 of the respective rows such that the following relationship is established between the voltage levels of the scanning signals. That is, when any one of the transmission signals Ys1, Ys2, Ys3, . . . , Ys320 is at the H level such that it is indicated that it is the corresponding horizontal scanning period when the scanning line 312 corresponding to the transmission signal is to be selected, and when the control signal INH is at the H level such that it is indicated that it is the second half period of the corresponding horizontal scanning period, the voltage selection signal forming circuit 354 first uses the voltage level of the scanning signal to the scanning line 312 as the selected voltage of the polarity corresponding to the signal level of the polarity indicating signal POL, and second generates a voltage selecting signal such that the non-selected voltage corresponds to the selected voltage when the second half period end.

Specifically, in the period when the control signal INH is at the H level, the voltage selecting signal forming circuit 354 makes the voltage selecting signal a for selecting the positive polarity selected voltage $+V_S$ at the H level in the corresponding second half period when the polarity indicating signal POL is at the H level, and outputs the voltage selecting signal b for selecting the positive non-selected voltage $+V_D/2$ at the H level when the control signal INH is changed to the L level with the end of the second half period. In the second half period when the control signal INH is at the H level, when the polarity indicating signal POL is at the L level, the voltage selecting signal forming circuit 354 makes the voltage selecting signal d for selecting the negative selected voltage $-V_S$ at the H level in the corresponding period and, when the control signal INH is changed to the L level, outputs the voltage selecting signal c for selecting the negative polarity non-selected voltage $-V_D/2$ at the H level.

A selector group 358 of each scanning line 312 has four switches 3581 to 3584. One end of each of the switches 3581 to 3584 are connected to the supply lines of $+V_S$, $+V_D/2$, $-V_D/2$, and $-V_S$. The other ends of the switches 3581 to 3584 are commonly connected to the corresponding scanning line. The voltage selecting signals a, b, c, and d are supplied to the gates of the switches 3581 to 3584. One end of each of the switches 3581 to 3584 is electrically connected to the other ends of the switches 3581 to 3584 when the voltage selecting signals a, b, c, and d input to the gates there of are at the H level. Thus, the respective scanning lines 312 are connected to any one of the supply lines of the voltages $\pm V_S$ and $\pm V_D/2$ through the switched on switches among the switches 3581 to 3584.

Next, the voltage waveforms of the scanning signals supplied by the scanning line driving circuit 350 will be described.

First, as illustrated in FIG. 7, the start pulse DY is sequentially shifted by the shift register 352 in accordance with the clock signal YCK every one horizontal scanning period to be output as the transmission signals Ys1, Ys2, Ys3, . . . , Ys320. Here, when the second half period has come in one horizontal scanning period when the transmission signal corresponding to the scanning line 312 of a certain row is at the H level, the selected voltage to the corresponding scanning line 312 is determined corresponding to the logic level of the polarity indicating signal POL in the corresponding second half period.

To be specific, in the second half period of the 1 horizontal scanning period when the scanning line 312 is selected, when the polarity indicating signal POL is at the H level, the voltage of the scanning signal supplied to the scanning line 312 of a certain row is the positive polarity selected voltage $+V_S$ to store the positive polarity non-selected voltage $+V_D/2$ corresponding to the corresponding selected voltage. When one vertical scanning period lapses, in the second half period of the 1 horizontal scanning period, the logic level of the polarity indicating signal POL is inverted to the L level such that the voltage of the scanning signal supplied to the corresponding scanning line 312 is the negative polarity selected voltage $-V_s$ to store the negative polarity non-selected voltage $-V_D/2$ corresponding to the corresponding selected voltage.

Thus, as illustrated in FIG. 7, the scanning signal Y1 to the scanning line 312 of the first row in a certain vertical scanning period becomes the positive polarity selected voltage $+V_S$ corresponding to the H level of the polarity indicating signal POL in the second half period of the 1 horizontal scanning period to store the positive polarity non-selected voltage $+V_D/2$. In the second half period of the next horizontal scanning period, the logic level of the polarity indicating signal POL is L level obtained by inverting the logic level selected before such the scanning signal Y1 to the corresponding scanning signal 312 becomes the negative selected voltage $-V_S$ to store the negative polarity non-selected voltage $-V_D/2$. Hereinafter, the above-described cycle is repeated. Since the logic level of the polarity indicating signal POL is inverted every one horizontal scanning period, the polarities of the scanning signals supplied to the respective scanning lines 312 are alternately inverted with respect to the adjacent scanning lines 312 of the respective rows every one horizontal scanning period. For example, in the vertical scanning period, when the selected voltage of the scanning signal Y1 of the first row is the positive polarity selected voltage $+V_S$, the selected voltage of the scanning signal Y2 of the second row is the negative selected voltage $-V_S$.

Figure 8:
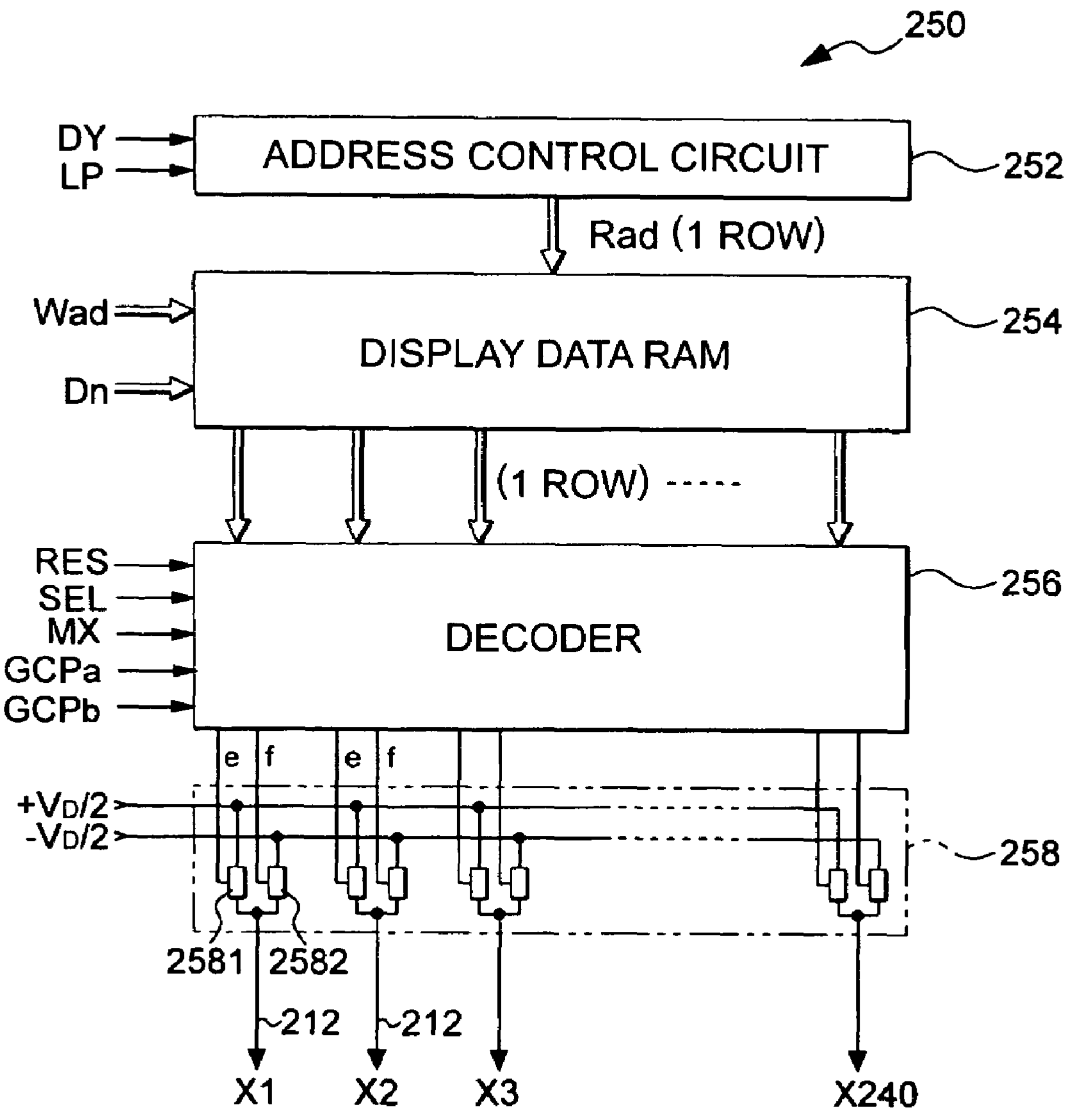
FIG. 8 is a block diagram illustrating the structure of a data line driving circuit.

Next, the data line driving circuit 250 will be described. FIG. 8 is a block diagram illustrating the structure of the data line driving circuit 250. In FIG. 8, an address control circuit 252 generates a row address Rad used for reading gray scale data, resets the row address Rad by the start pulse DY supplied at the initial stage of the 1 vertical scanning period, and steps the row address Rap to a latch pulse LP supplied every one horizontal scanning period. A display data random access memory (RAM) 254 is a dual port RAM having memory regions corresponding to the pixels 116 of 320 rows×240 columns. On a writing side, gray scale data supplied by the control circuit 400 is written in a writing address Wad and, on a reading side, gray scale data (the gray scale data of the 240 pixels 116 that belong to a row) of the row address Rad is collectively read.

A decoder 256 is a circuit for generating voltage selecting signals e and f for selecting the voltages of data signals X1, X2, . . . , and X240 based on read 240 gray scale data items, the reset signal RES, the AC driving signal MX, and the leading and trailing-edge selecting signal SEL, and the leading-edge driving gray scale control pulse GCPa or the trailing-edge driving gray scale control pulse GCPb. The voltage selecting signals e and f are exclusively at an active level (H level). When the voltage selecting signal e is at the H level, the selection of the voltage $+V_D/2$ is indicated. When the voltage selecting signal f is at the H level, the selection of $-V_D/2$ is indicated. The detailed operation of the decoder 256 will be described later.

A selector group 258 of each data line 212 has two switches 2581 and 2582. One ends of each of the switches 2581 and 2582 are connected to the supply lines of $+V_D/2$ and $-V_D/2$. The other ends of the switches 2581 and 2582 are connected to the common data line 212. The voltage selecting signals e and f are supplied to the gates of the switches 2581 and 2582. One end of each of the switches 2581 and 2582 is electrically connected to the other ends of the switches 2581 and 2582 when the voltage selecting signals e and f input to the gates there of are at the H level. Thus, the respective data lines 212 are connected to any one of the supply lines of the voltages $\pm V_D/2$ through the switched on switch between the switches 2581 and 2582.

Next, while paying attention to the operation of the decoder 256, the waveforms of the data signals supplied to the data signals 212 will be described.

First, when gray scale data assigned to the pixels 116 in a certain horizontal scanning period is [000] that represents white display, as illustrated in FIG. 9, the decoder 256 generates the voltage selecting signals e and f in the first half period and in the second half period of the horizontal scanning period such that the voltage $-V_D/2$ is selected when the AC driving signal MX is at the H level and that the voltage $+V_D/2$ is selected when the AC driving signal MX is at the L level. Thus, when the gray scale data is [111] that represents black display, as illustrated in FIG. 9, the decoder 256 generates the voltage selecting signals e and f in the first half period and in the second half period of the horizontal scanning period such that the voltage $+V_D/2$ is selected when the AC driving signal MX is at the H level and that the voltage $-V_D/2$ is selected when the AC driving signal MX is at the L level. In such cases, the timings at which the levels of the voltage selecting signals e and f are changed are defined by the rising of the reset signal RES supplied at the initial stage of the first half period and at the initial stage of the second half period.

Figure 10:
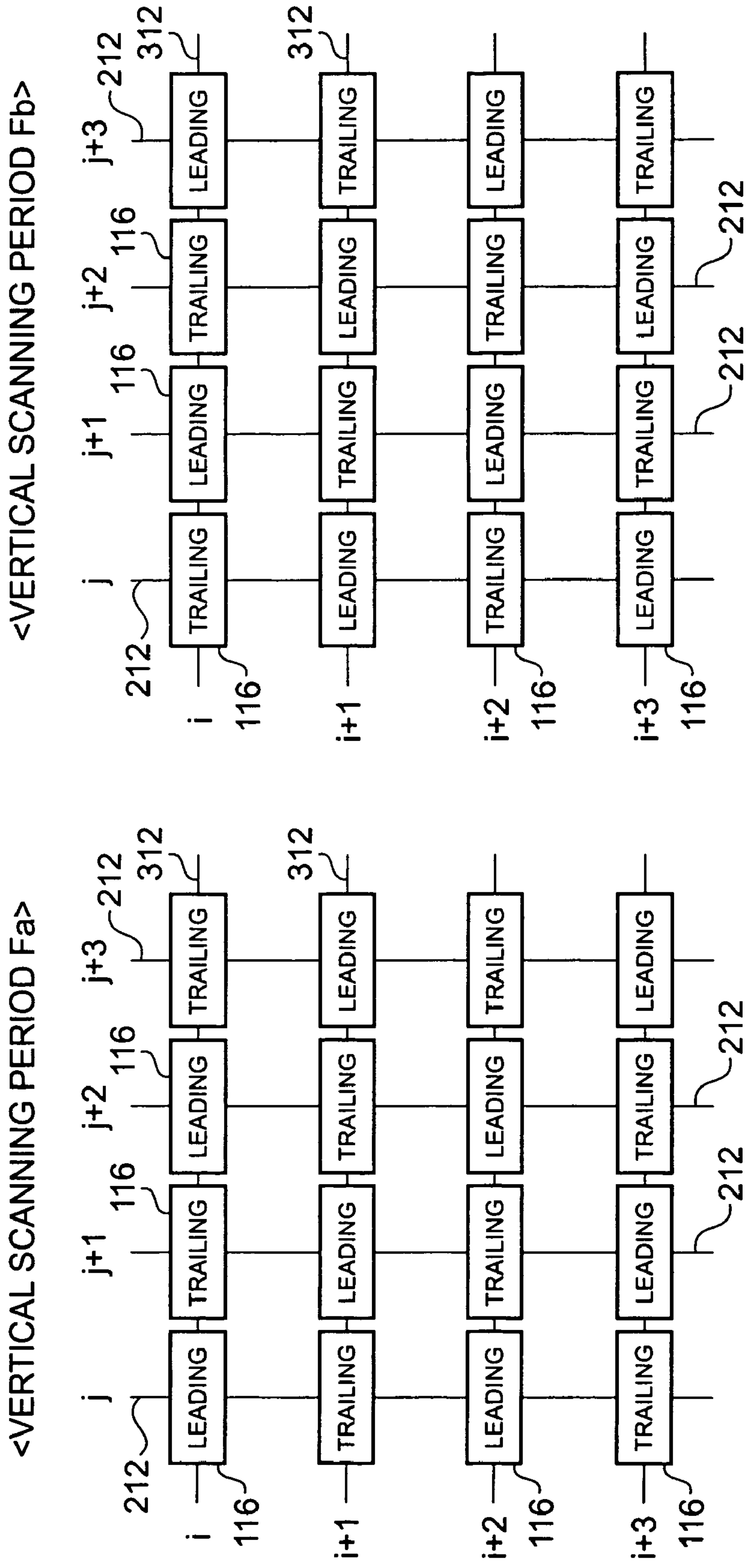
FIG. 10 is a view illustrating conversion between the leading-edge driving and the trailing-edge driving.

On the other hand, when the gray scale data assigned to the pixels 116 represent intermediate gray scale (gray scale represented by the gray scale [110], [101], [100], [011], [010], and [001]) excluding white and black scales, the decoder 256 generates the voltage selecting signals e and f to satisfy the following three conditions. First, the decoder 256 generates the voltage selecting signals e and f such that the leading-edge driving and the trailing-edge driving as the driving modes of the respective pixels 116 are changed every vertical scanning period. For example, as illustrated in FIG. 10, when the jth pixel 116 (the pixel 116 in the leftmost portion of the drawing) that belongs to the ith row is driven by the leading-edge driving (referred to as leading in FIG. 10) with respect to the vertical scanning period Fa, the pixel 116 is driven by the leading-edge driving (referred to as trailing in FIG. 10) in the vertical scanning period Fb immediately after the vertical scanning period Fa. Second, the decoder 256 generates the voltage selecting signals e and f such that the driving mode of the odd pixels 116 is different from the driving mode of the even pixels 116. When the vertical scanning period Fa illustrated in FIG. 10 is taken as an example, meanwhile the odd (the jth and the (j+2)th) pixels 116 that belong to the ith row are driven by the leading-edge driving, the even (the (j+1)th and the (j+3)th) pixels 116 that belong to the same row are driven by the leading-edge driving. Third, the decoder 256 generates the voltage selecting signals e and f such that the driving mode of the pixels 116 that belong to the odd rows is different from the driving mode of the pixels 116 that belong to the even rows. When the vertical scanning period Fa illustrated in FIG. 10 is taken as an example, meanwhile the jth pixels 116 that belong to the odd rows (the ith row and the (i+2)th row) are driven by the leading-edge driving, the jth pixels 116 that belong to the even rows (the (i+1)th row and the (i+3)th row) are driven by the leading-edge driving.

In order to satisfy such conditions, in the horizontal scanning period when the leading and trailing-edge selecting signal SEL is at the H level, the decoder 256 generates the voltage selecting signals e and f such that the odd data lines 212 are driven by the leading-edge driving and, at the same time, the even data lines 212 are driven by the leading-edge driving. To be specific, as illustrated in FIGS. 9 and 11, the decoder 256 generates the voltage selecting signals e and f such that the voltage $-V_D/2$ is selected when the AC driving signal MX is at the H level and that the voltage $+V_D/2$ is selected when the AC driving signal MX is at the L level with respect to the odd data lines 212 at the falling of the pulse corresponding to the gray scale data in the leading-edge driving gray scale control pulse GCPa. Furthermore, the decoder 256 generates the voltage selecting signals e and f such that the voltage $+V_D/2$ is selected when the AC driving signal MX is at the H level and that the voltage $-V_D/2$ is selected when the AC driving signal MX is at the L level with respect to the even data lines 212 at the falling of the trailing-edge driving gray scale control pulse GCPb corresponding to gray scale data. As a result, in the horizontal scanning period when the leading and trailing-edge selecting signal SEL is at the H level, as illustrated in FIG. 11, the data voltage in accordance with the leading-edge driving is applied to the odd data lines 212 and the data voltage in accordance with the leading-edge driving is applied to the even data lines 212.

On the other hand, in the horizontal period when the leading and trailing selecting signal SEL is at the L level, the decoder 256 generates the voltage selecting signals e and f such that the odd data lines 212 are driven by the leading-edge driving and, at the same time, the even data lines 212 are driven by the leading-edge driving. To be specific, as illustrated in FIGS. 9 and 11, the decoder 256 generates the voltage selecting signals e and f such that the voltage $+V_D/2$ is selected when the AC driving signal MX is at the H level and that the voltage $-V_D/2$ is selected when the AC driving signal MX is at the L level with respect to the odd data lines 212 at the falling of the trailing-edge driving gray scale control pulse GCPb. Furthermore, the decoder 256 generates the voltage selecting signals e and f such that the voltage $-V_D/2$ is selected when the AC driving signal MX is at the H level and that the voltage $+V_D/2$ is selected when the AC driving signal MX is at the L level with respect to the even data lines 212 at the falling of the leading-edge driving gray scale control pulse GCPa corresponding to gray scale data. As a result, in the horizontal scanning period when the leading and trailing-edge selecting signal SEL is at the L level, as illustrated in FIG. 11, the data voltage in accordance with the leading-edge driving is applied to the odd data lines 212 and the data voltage in accordance with the leading-edge driving is applied to the even data lines 212.

As described above, the logic level of the leading and trailing-edge selecting signal SEL is inverted in every horizontal scanning period. Thus, by operating the above-described operations, as illustrated in FIGS. 10 and 11, the odd pixels 116 and the even pixels 116 are driven by different driving modes such that the pixels 116 of the odd rows and the pixels 116 of the even rows are driven by different driving modes. Furthermore, in the horizontal scanning period when the same scanning lines 312 are selected in the temporally leading and trailing vertical scanning periods, the logic level of the leading and trailing-edge selecting signal SEL is inverted. For example, when a first operation mode is selected, meanwhile, in the vertical scanning period Fa, the leading and trailing-edge selecting signal SEL is at the H level in the horizontal scanning period when the scanning lines 312 of the odd rows (for example, the ith row) are selected, in the vertical scanning period Fb immediately after the vertical scanning period Fa, the leading and trailing-edge selecting signal SEL is at the L level in the horizontal scanning period when the odd scanning lines 312 are selected. Thus, as illustrated in FIGS. 10 and 11, the driving modes of the respective pixels 116 are changed every vertical scanning period. When the jth pixel 116 that belongs to the ith row is taken as an example among the pixels 116 illustrated in FIG. 10, meanwhile the pixel 116 is driven by the leading-edge driving in the vertical scanning period Fa, the pixel 116 is driven by the leading-edge driving in the vertical scanning period Fb.

As described above, according to the present embodiment, the driving mode of the odd data lines 212 is different from the driving mode of the even data lines 212. As described above, the leading-edge driving and the trailing-edge driving are mixed with each other as the driving modes of the data lines 212 in the 1 horizontal scanning period, such that it is possible to prevent the horizontal crosstalk. The effect will be described in detail as follows.

Figure 12A:
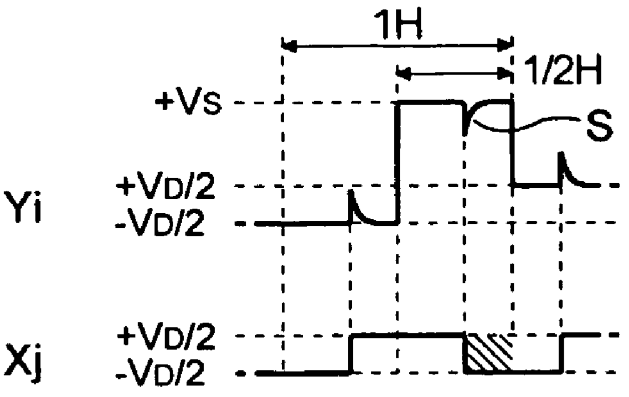
FIGS. 12A and B are views illustrating the effect of the embodiment.
Figure 12B:
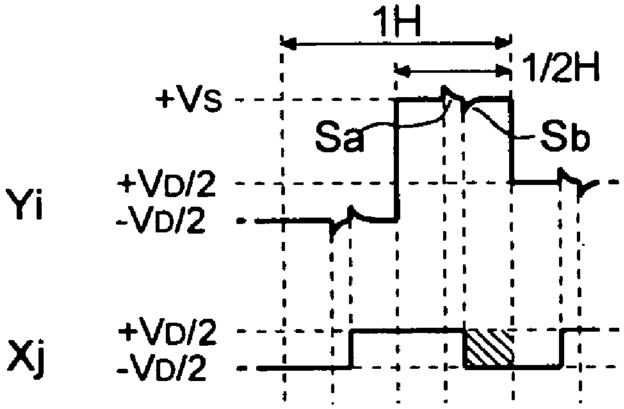
Figure 13A:
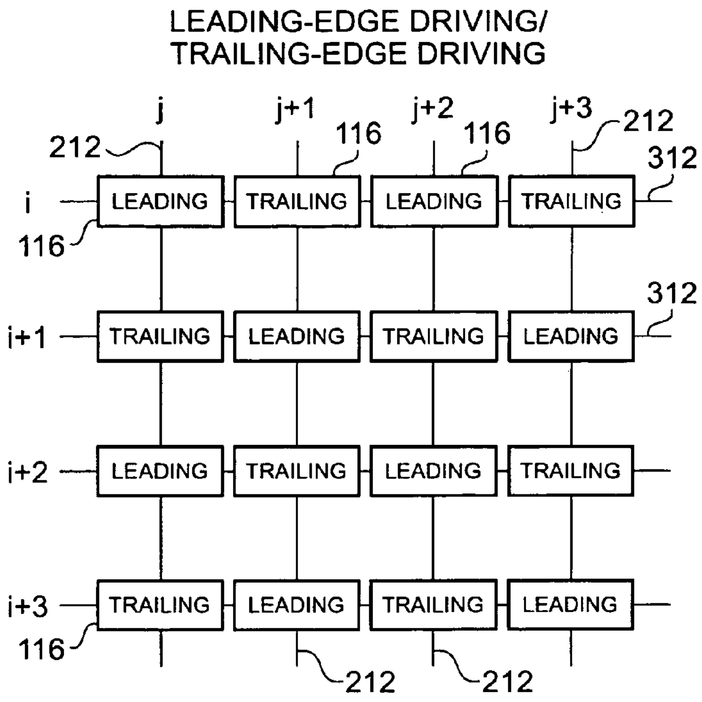
FIGS. 13A and B are views illustrating the problems of an electro-optical device according to a comparative example.
Figure 13B:
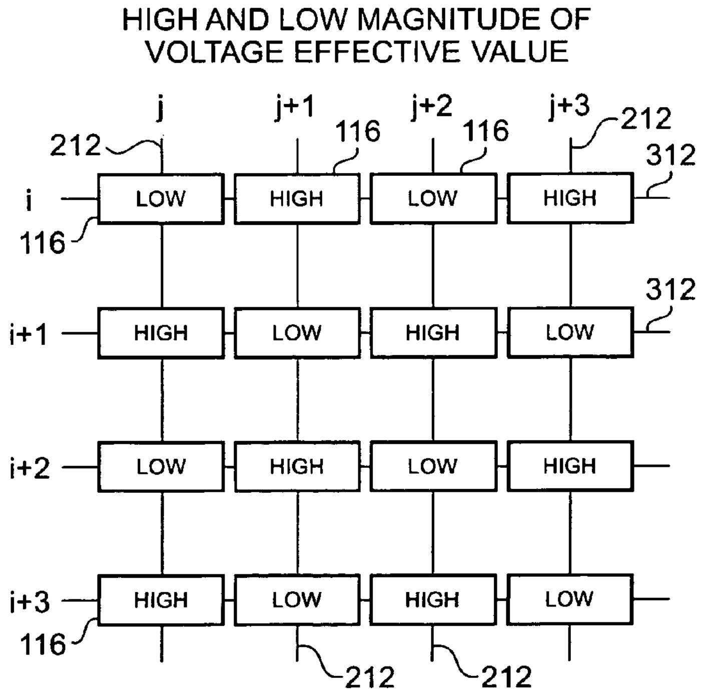

According to the present embodiment, since the scanning lines 312 are made of metal having large resistivity such as ITO, the respective scanning lines 312 are capacitively combined with the data lines 212 from the first column to the 240th column. Thus, in a certain horizontal scanning period, when the voltage of the data lines 212 can be converted from any one of $+V_D/2$ and $-V_D/2$ into the other, as illustrated in FIG. 12(*a*), a spike (differential waveform noise) is generated in the respective scanning lines 312. When the spike is generates in the scanning lines 312 in the second half period of the 1 horizontal scanning period, the selected voltage changes. As a result, errors are generated in the voltage effective value applied to the liquid crystal capacitors 118 such that the gray scale of the respective pixels 116 changes from the original gray scale. The errors of the gray scale generated in the row direction are referred to as the horizontal crosstalk so as to be distinguished from the above-described crosstalk in a vertical direction.

Here, the magnitude of the spike generated in the scanning lines 312 varies in accordance with the number of data lines 212, whose voltages are changed at the same time. That is, the larger the number of data lines 212 whose voltages are changed, the larger the spike is and the larger the influence of the pixels 116 on the value effective value (gray scale) is. Thus, when the data voltage is changed by only any one of the leading-edge driving and the trailing-edge driving, in the case in which the same gray scale data is assigned to all of the pixels 116 that belong to one row, the voltages of the 240 data lines 212 corresponding to the pixels 116 are simultaneously changed such that the spike generated in the scanning lines 312 significantly increases to remarkably deteriorate display quality.

On the other hand, according to the present embodiment, even if the same gray scale data is assigned to all of the pixels 116 that belong to one row, meanwhile voltages are changed at the timing in accordance with the leading-edge driving in some data lines 212 (the data lines 212 in the odd columns), voltages are changed at the timing in accordance with the leading-edge driving in the other data lines 212 (the data lines 212 in the even columns). Thus, as illustrated in FIG. 12(*b*), the spike generated in the period when the selected voltage is applied to the scanning lines 312 is divided into two as denoted by Sa and Sb.

Further, since the number of data lines 212, whose voltages are changed at the same timing is 160, the magnitude of the spike is reduced. As described above, according to the present embodiment, it is possible to prevent changes in the selected voltage (further, changes in the voltage effective value applied to the pixels 116), which are caused by the spike in accordance with the conversion of the data voltage and to thus effectively prevent horizontal crosstalk.

In order to prevent the horizontal crosstalk caused by the spike, the driving mode of the respective pixels 116 may be fixed to either leading-edge driving or trailing-edge driving. That is, the plurality of pixels 116 are divided into two groups such that the pixels 116 that belong to the first group are driven by the leading-edge driving over the entire vertical scanning period and that the pixels 116 that belong to the second group are driven by the leading-edge driving over the entire vertical scanning period. However, under such a structure, display quality may deteriorate due to the difference in the voltage effective values in the respective driving modes. The problem will be described in detail as follows.

Figure 15:
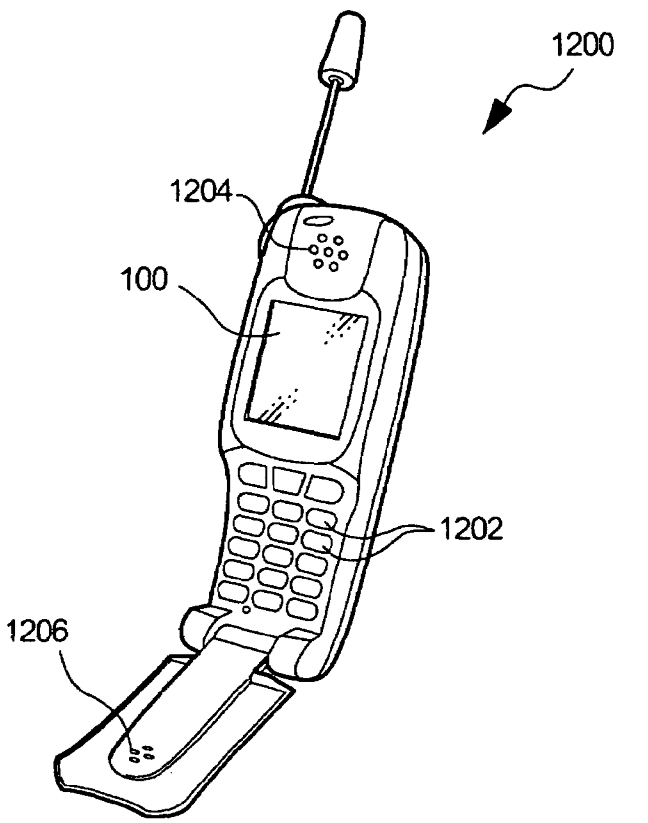
FIG. 15 is a perspective view illustrating the structure of a mobile telephone that is an example of an electronic apparatus according to the present invention.

The present inventor found that the voltage effective value applied to the pixels 116 by the leading-edge driving is not necessarily equal to the voltage effective value applied to the pixels 116 by the leading-edge driving. Various factors of causing the difference between the voltage effective values are considered. One of the factors is the difference in the discharge degrees of charges from the pixels 116. That is, when the pixels 116 are driven by the leading-edge driving, the charges stored in the liquid crystal capacitors 118 in accordance with the application of the turning-on voltage from the point of time of the second half period are discharged during the period when the turning-off voltage is applied, which is subsequent to the second half period. However, when the pixels 116 are driven by the leading-edge driving, since the application of the turning-on voltage ends at the time where the selection of the scanning lines 312 is cancelled, discharge from the liquid crystal capacitors 118 does not occur. As a result, even if the same gray scale data is assigned to the pixels 116, the voltage effective value applied to the pixels 116 by the leading-edge driving is smaller than the voltage effective value applied to the pixels 116 by the leading-edge driving. Thus, when the driving mode of the pixels 116 is fixed to the state illustrated in FIG. 15(*a*) over the entire vertical scanning period, even if the same gray scale is indicated to all of the pixels 116, the voltage effective values actually applied to the respective pixels 116 vary with adjacent pixels 116 in the row or column direction as illustrated in FIG. 15(*b*) to deteriorate display quality.

On the other hand, according to the present embodiment, since the driving mode of the respective pixels 116 can be converted from any one of the leading-edge driving and the trailing-edge driving into the other every vertical scanning period, even if the voltage effective values to the pixels 116 are different from each other in the respective vertical scanning periods in accordance with the leading-edge driving and the trailing-edge driving, a difference in the voltage effective values is removed in view of the plurality of vertical scanning periods. Thus, according to the present embodiment, it is possible to prevent the generation of horizontal crosstalk by mixing the leading-edge driving and the trailing-edge driving with each other and to compensate for the difference in the voltage effective values, such that it is possible to prevent display quality from deteriorating.

B: Modification

The above-described embodiments are exemplary. Thus, various changes may be made therein without departing from the spirit and scope of the invention. To be specific, at least the following modification can be considered.

According to the present embodiment, the leading-edge driving gray scale control pulse GCPa and the trailing-edge driving gray scale control pulse GCPb are output at symmetrical timings on a time base. According to such a structure, a period, in which the turning-on voltage is applied in accordance with the respective intermediate gray scale, in the leading-edge driving is equal to that in the leading-edge driving. However, the output timings of the leading-edge driving gray scale control pulse GCPa and the trailing-edge driving gray scale control pulse GCPb may be determined such that a period, in which the turning-on voltage is applied in accordance with the respective intermediate gray scale, in the leading-edge driving is different from that in the leading-edge driving. A specific example will be taken as follows.

Figure 14A:
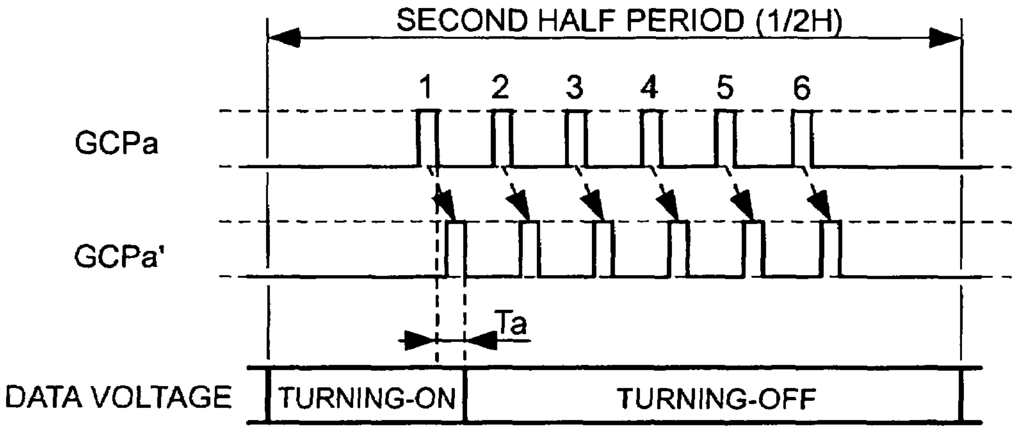
FIGS. 14A and B are views illustrating the waveform of a gray scale control pulse in accordance with a modification.
Figure 14B:
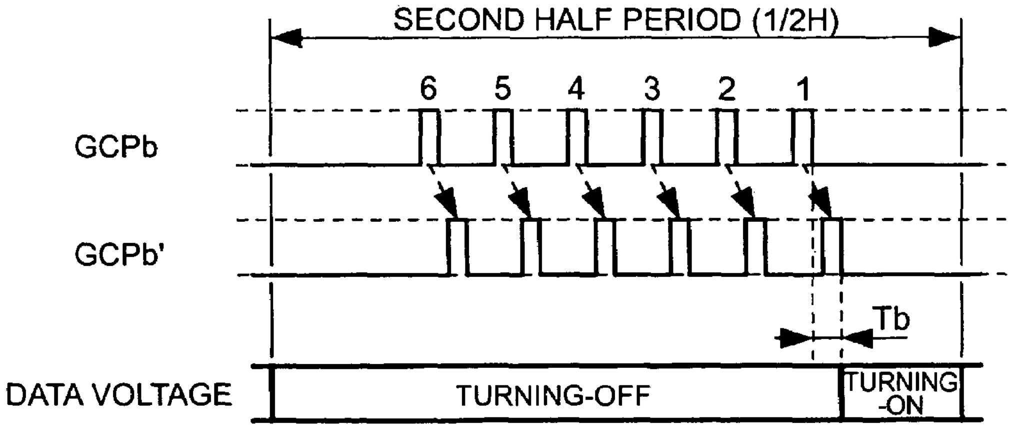

As described above, the voltage effective value applied to the pixels 116 by the leading-edge driving is different from the voltage effective value applied to the pixels 116 by the leading-edge driving. In an aspect to be described later, the output timings of the leading-edge driving gray scale control pulse GCPa and the trailing-edge driving gray scale control pulse GCPb are determined such that the difference between the voltage effective values is compensated for. For example, a case, in which the voltage effective value in accordance with the leading-edge driving is smaller than the voltage effective value in accordance with the leading-edge driving, is considered. In this case, as illustrated in FIG. 14(*a*), when the output timing of the leading-edge driving gray scale control pulse GCPa' used for the leading-edge driving moves backward from the point of time (the output timing of the leading-edge driving gray scale control pulse GCPa according to the above embodiment) corresponding to the respective intermediate gray scale on the time base, the period, in which the turning-on voltage is applied, is extended. For example, when the output timing of the leading-edge driving gray scale control pulse GCPa' moves backward from the output timing of the gray scale control pulse GCPa by the length of time Ta, as illustrated in FIG. 14(*a*), the period, in which the turning-on voltage is applied, when the gray scale data is [001] is extended by the length of time Ta. As a result, it is possible to improve the voltage effective value in accordance with the leading-edge driving. As illustrated in FIG. 14(*b*), when the output timing of the trailing driving gray scale control pulse GCPb' used for the leading-edge driving moves backward from the point of time (the output timing of the trailing-edge driving gray scale control pulse GCPb according to the above embodiment) corresponding to the respective intermediate gray scale on the time base, the period, in which the turning-on voltage is applied, is reduced. For example, when the output timing of the trailing-edge driving gray scale control pulse GCPb' moves backward from the output timing of the gray scale control pulse GCPb by the length of time Tb, as illustrated in FIG. 14(*b*), the period, in which the turning-on voltage is applied, when the gray scale data is [001] is extended by the length of time Tb. As a result, it is possible to improve the voltage effective value in accordance with the leading-edge driving.

Here, the voltage effective value in accordance with the leading-edge driving is smaller than the voltage effective value in accordance with the leading-edge driving. However, when the voltage effective value in accordance with the leading-edge driving is larger than the voltage effective value in accordance with the leading-edge driving, the output timings preferably move in the direction opposite to the direction in the example of FIGS. 14(*a*) and 14(*b*).

As described above, when the output timings of the leading-edge driving gray scale control pulse and the trailing-edge driving gray scale control pulse are not determined based on the length of time corresponding to the respective intermediate gray scale but are determined based on the difference in the voltage effective values in accordance with the respective driving modes, it is possible to compensate for the difference in the voltage effective values in accordance with the respective driving modes and to maintain high display quality. There may be cases, in which the difference in the voltage effective values cannot be completely removed by this method. This is because it is considered that the difference in the voltage effective values in accordance with the respective driving modes is dependent on other conditions such as the temperature of the use environment of an electro-optical device. Thus, even if the output timings of the respective pulses are controlled in accordance with the difference in the voltage effective values, it is still advantageous that the driving modes of the respective pixels 116 be alternately changed as described in the above embodiment.

According to the above embodiment, the driving mode of the odd data lines 212 is different from the driving mode of the even data lines 212. However, methods of dividing the data lines 212, to which the respective driving modes are applied, are not restricted to this. For example, the plurality of data lines 212 may be divided into a specific number of groups in the arrangement order such that the driving mode of the odd data lines 212 may be different from the driving mode of the even data lines 212. As described above, according to the present invention, the plurality of data lines 212 are divided into two groups such that the driving mode of the data lines 212 that belong to one group (the first group) is different from the driving mode of the data lines 212 that belong to the other group (the second group).

According to the embodiment, the driving modes of the respective pixels 116 are changed at every one vertical scanning period. However, the driving modes of the respective pixels 116 may be changed every plurality of vertical scanning periods. Also, according to the above embodiment, the 1 horizontal scanning period is divided into the first half period and the second half period, and the selected voltage is applied to the scanning lines 312 in the second half period. However, the selected voltage may be applied in the first half period instead in the second half period. Also, without dividing the 1 horizontal scanning period into the first half period and the second half period, the selected voltage may be applied to the scanning lines 312 from the starting point to the ending point of time of the 1 horizontal scanning period.

According to the above embodiment, the data line driving circuit 250, the scanning line driving circuit 350, the control circuit 400, and the voltage generating circuit 500 are described as separate integrated circuits. However, part or all of the circuits may constitute an integrated circuit. Also, according to the above embodiment, the transmissive liquid crystal panel is taken as an example. However, the above embodiment can be applied to a reflective liquid crystal panel that performs display (reflective display) by reflecting incident light from an observer side to the observer side and to a transflective liquid crystal panel that can perform both transmissive and reflective displays. The number of gray scale is not restricted to eight and other arbitrary numbers of gray scale (such as 4, 16, 32, and 64 gray scale) may be adopted. One dot may be comprised of three pixels 116 of red (R), green (G), and blue (B) to display color images. According to the above embodiment, the liquid crystal panel 100 of the normally white mode is taken as an example. However, the present invention can be applied to a liquid crystal panel of a normally black mode that displays black when no voltage is applied to liquid crystal.

According to the above embodiment, the active matrix liquid crystal panel 100 using the TFDs 220 as the active elements is taken as an example. However, the present invention can be applied to a passive matrix electro-optical device, in which the liquid crystal 160 is interposed at the intersections of the band-shaped electrodes without using the active elements.

According to the above embodiment, the TFDs 220 are connected to the data lines 212, and the liquid crystal capacitors 118 are connected to the scanning lines 312. Alternatively, the TFDs 220 may be connected to the scanning lines 312 and the liquid crystal capacitors 118 may be connected to the data lines 212, respectively. Furthermore, the TFDs 220 are only an example of a two terminal type switching element. An element using a zinc oxide (ZnO) varistor or a metal semi-insulator (MSI), or a substance obtained by serially connecting these two elements or connecting these two elements in parallel in a reverse direction may be used as the two terminal type switching element.

According to the above embodiment, the liquid crystal device using the TN liquid crystal is taken as an example. However, Super Twisted Nematic (STN) liquid crystal or guest host liquid crystal, in which dye (guest) having anisotropy with respect to the absorption of visible rays in the direction of major axis and the minor axis of molecules dissolves in liquid crystal (host) where molecules are uniformly arranged such that the dye molecules are arranged to be parallel with the liquid crystal molecules, may be used. Also, as an alignment method, a vertical alignment (homeotropics alignment) in which, when no voltage is applied, the liquid crystal molecules are arranged to be vertical with respect to the both substrates, and when a voltage is applied, the liquid crystal molecules may be arranged to be horizontal with respect to the both substrates, and a parallel (horizontal) alignment (homogeneous alignment) in which, when no voltage is applied, the liquid crystal molecules are arranged horizontally with respect to the both substrates, and when a voltage is applied, the liquid crystal molecules are vertically arranged with respect to the both substrates, may be used. As described above, according to the present invention, various liquid crystals or alignment methods of liquid crystal may be used.

The present invention can be applied to other electro-optical devices than the liquid crystal device. That is, the present invention can be applied to any device that displays images using electro-optical materials that convert an electrical operation such as supply of current or application of voltage into an optical operation such as change in brightness or transmittance. For example, the present invention is applicable to various electro-optical devices such as an electroluminescent (EL) display device using EL as an electro-optical material, an electrophoresis display device using a micro capsule including colored liquid and white particles dispersed into the liquid as an electro-optical material, a twisted ball display using a twisted ball, in which regions having different polarities are distinguished from each other by being colored different, as an electro-optical material, a toner display using black toner as an electro-optical material, and a plasma display panel (PDP) using high pressure gas such as helium and neon as an electro-optical material.

C: Electronic Apparatus

Next, an electronic apparatus having the electro-optical device according to the above-described embodiment as a display device will be described. FIG. 15 is a perspective view illustrating the structure of a mobile telephone using the electro-optical device 10 according to the present embodiment. As illustrated in FIG. 10, a mobile telephone 1200 includes a plurality of operation buttons 1202, an earpiece 1204, a mouthpiece 1206, and the electro-optical device 10. Since the other components than the liquid crystal panel 100 are built in a case among the electro-optical device 10, they are not shown on the external appearance of the mobile telephone 1200.

Figure 16:
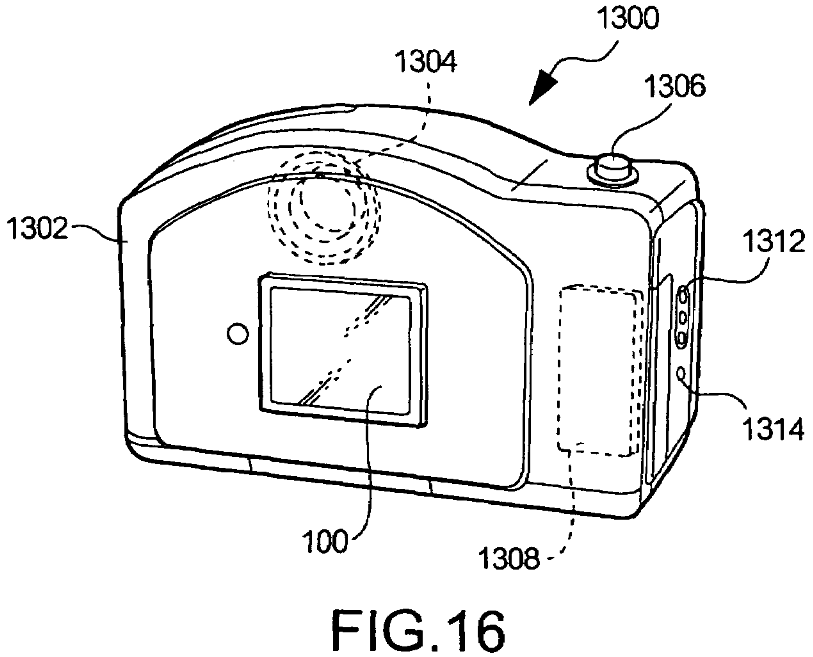
FIG. 16 is a perspective view illustrating the structure of a digital camera that is an example of an electronic apparatus according to the present invention.

FIG. 16 is a perspective view illustrating the structure of a digital camera, to whose finder the electro-optical device 10 is applied. A silver halide camera sensitizes a film by an optical phase of a subject. However, a digital camera 1300 photoelectrically converts the light of a pictured subject by a photographing element such as a charge coupled device (CCD) and generates and stores a photographing signal. Here, the above-described liquid crystal panel 100 is provided on the back of the main body 1302 of the digital camera 1300. Since the liquid crystal panel 100 displays images based on the photographing signal, the liquid crystal panel 100 functions as a finder that displays a subject. A light receiving unit 1304 is provided on the top surface (the rear side in FIG. 16) of the main body 1302. When a photographer confirms a subject displayed on the liquid crystal panel 100 and presses a shutter button 1306, the photographing signal of the CCD at the point of time is transmitted and stored in the memory of a circuit substrate 1308. In the digital camera 1300, on the side of the main body 1302, a video signal output terminal 1312 for performing external display and an input and output terminal 1314 for data communications are provided.

Electronic apparatuses in which the electro-optical device 10 can be used as the display device include a notebook personal computer (PC), a liquid crystal TV, a view-finder-type (or monitor-direct-view-type) video recorder, a car navigation device, a pager, an electronic note, an electronic calculator, a word processor, a workstation, a videophone, a POS terminal, an apparatus having a touch panel as well as the mobile telephone illustrated in FIG. 15 and the digital camera illustrated in FIG. 16. It is possible to prevent the generation of horizontal crosstalk and to display high quality images by a simple and easy structure.

What is claimed is:

1. A driving circuit of an electro-optical device for driving pixels provided at intersections of a plurality of scanning lines and a plurality of data lines, the driving circuit comprising:

a scanning line driving circuit sequentially selecting the plurality of scanning lines and applying a selected voltage to the selected scanning lines; and a data line driving circuit performing, on the plurality of data lines, one of:

leading-edge driving including:

applying a turning-on voltage having a polarity reverse to a polarity of the selected voltage in a period from a starting point of a period when the selected voltage is applied to the scanning lines to a point of time after a lapse of time corresponding to the gray scale of the pixels corresponding to the intersections of the data lines and the scanning lines, in a greater period when the selected voltage is applied to the scanning lines; and applying a turning-off voltage having the same polarity as the polarity of the selected voltage in the remainder of the greater period; and trailing-edge driving including:

applying the turning-on voltage in a period from the point of time preceding the final point of the period when the selected voltage is applied by the length of time corresponding to the gray scale of the corresponding pixel; and applying the turning-off voltage in the remainder of the greater period, wherein the data line driving circuit drives the respective data lines that belong to a first group among the plurality of data lines by the one of the leading-edge driving and the trailing-edge driving in the period when the selected voltage is applied to the respective scanning lines, drives the respective data lines that belong to a second group different from the first group by a different driving mode than the one of the leading-edge driving and the trailing-edge driving used for the first group, and alternately changes the driving modes between the leading-edge driving and the trailing-edge driving for the respective data lines when the selected voltage is applied to the scanning line corresponding to one pixel.

2. The driving circuit of the electro-optical device according to claim 1, wherein the data line driving circuit changes the driving modes of the data lines corresponding to the respective pixels at one of every vertical scanning period and every plurality of vertical scanning periods.

3. The driving circuit of an electro-optical device according to claim 1, wherein the scanning line driving circuit applies a selected voltage to the selected scanning lines in a first half period or a second half period obtained by dividing one horizontal scanning period, in which the respective scanning lines are selected, wherein the data line driving circuit applies, to a data line, the turning-on voltage in a period corresponding to the gray scale of the corresponding pixel in the first half period or the second half period, and a turning-off voltage in the remainder of the period, and conversely, applies the turning-off voltage in a period corresponding to the gray scale of the corresponding pixel in the other half period, and the turning-on voltage in the remainder of the period.

4. The driving circuit of an electro-optical device according to claim 1, wherein the scanning line driving circuit inverts the polarity of the selected voltage at every horizontal scanning period based on an intermediate voltage which has a value approximately mid-way between the turning-on voltage and the turning-off voltage.

5. The driving circuit of an electro-optical device according to claim 1, wherein the scanning line driving circuit inverts the polarity of the selected voltage every vertical scanning period based on an intermediate voltage which has a value approximately mid-way between the turning-on voltage and the turning-off voltage.

6. A method of driving an electro-optical device for driving pixels provided at intersections of a plurality of scanning lines and a plurality of data lines, the method comprising the steps of:

sequentially selecting the plurality of scanning lines and applying a selected voltage to the selected scanning lines; and performing, on the data lines corresponding to the respective pixels, one of:

leading-edge driving including:

applying a turning-on voltage having a polarity reverse to a polarity of the selected voltage in a period from a starting point of a period when the selected voltage is applied to the scanning lines to a point of time after a lapse of time corresponding to the gray scale of the pixels corresponding to the intersections of the data lines and the scanning lines, in a greater period when the selected voltage is applied to the scanning lines; and applying a turning-off voltage having the same polarity as the polarity of the selected voltage in the remainder of the greater period; and trailing-edge driving including:

applying the turning-on voltage in a period from the point of time preceding the final point of the period when the selected voltage is applied by the length of time corresponding to the gray scale of the corresponding pixel; and applying the turning-off voltage in the remainder of the greater period on the a plurality of data lines, to the respective data lines that belong to a first group among the plurality of data lines, and performing a different driving mode than the one of the leading-edge driving and the trailing-edge driving used for the first group to the respective data lines that belong to a second group different from the first group, and alternately changing the driving mode between the leading-edge driving and the trailing-edge driving.

7. An electro-optical device comprising:

pixels provided at intersections of a plurality of scanning lines and a plurality of data lines;

a scanning line driving circuit sequentially selecting the plurality of scanning lines and applying a selected voltage to the selected scanning lines; and a data line driving circuit for performing, on the plurality of data lines, one of:

leading-edge driving including:

applying a turning-on voltage having a polarity reverse to a polarity of the selected voltage in a period from a starting point of a period when the selected voltage is applied to the scanning lines to a point of time after a lapse of time corresponding to the gray scale of the pixels corresponding to the intersections of the data lines and the scanning lines, in a greater period when the selected voltage is applied to the scanning lines; and applying a turning-off voltage having the same polarity as the polarity of the selected voltage in the remainder of the greater period; and trailing-edge driving including:

applying the turning-on voltage in a period from the point of time preceding the final point of the period when the selected voltage is applied by the length of time corresponding to the gray scale of the corresponding pixel; and applying the turning-off voltage in the remainder of the greater period, wherein the data line driving circuit drives the respective data lines that belong to a first group among the plurality of data lines by one of the leading-edge driving and the trailing-edge driving in the period when the selected voltage is applied to the respective scanning lines, drives the respective data lines that belong to a second group different from the first group by a different driving mode than the one of the leading-edge driving and the trailing-edge driving used for the first group, and alternately changes the driving modes between the leading-edge driving and the trailing-edge driving for the respective data lines when the selected voltage is applied to the scanning line corresponding to one pixel.

8. An electronic apparatus comprising the electro-optical device according to claim 7 as a display device.

* * * * *